(12) United States Patent
Xiong et al.

(10) Patent No.: US 11,963,195 B2
(45) Date of Patent: *Apr. 16, 2024

(54) TIMING DETERMINATION TECHNIQUES FOR 5G RADIO ACCESS NETWORK CELLS

(71) Applicant: Apple Inc., Cupertino, CA (US)

(72) Inventors: Gang Xiong, Portland, OR (US); Debdeep Chatterjee, San Jose, CA (US); Ajit Nimbalker, Fremont, CA (US); Hong He, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,574

(22) Filed: Aug. 18, 2022

(65) Prior Publication Data

US 2022/0400509 A1 Dec. 15, 2022

Related U.S. Application Data

(63) Continuation of application No. 16/488,133, filed as application No. PCT/US2018/023882 on Mar. 22, 2018, now Pat. No. 11,425,750.

(Continued)

(51) Int. Cl.
*H04W 72/23* (2023.01)
*H04W 72/0446* (2023.01)
(Continued)

(52) U.S. Cl.
CPC ....... *H04W 72/23* (2023.01); *H04W 72/0446* (2013.01); *H04W 74/0833* (2013.01); *H04W 76/27* (2018.02)

(58) Field of Classification Search
CPC ............. H04W 72/23; H04W 72/0446; H04W 74/0833; H04W 76/27
(Continued)

(56) References Cited

U.S. PATENT DOCUMENTS 10,057,032 B2 * 8/2018 Yi .......................... H04L 5/0082
2012/0113831 A1 * 5/2012 Pelletier ................ H04L 5/0053
370/252

(Continued)

FOREIGN PATENT DOCUMENTS

CN 102595634 A 7/2012
CN 104185293 A 12/2014
(Continued)

OTHER PUBLICATIONS

Ericsson, "NR four-step random access procedure" 3GPP TSG-RAN WG1 Meeting #88; R1-1702128; Feb. 13, 2017.
(Continued)

*Primary Examiner* — Mang Hang Yeung

(74) *Attorney, Agent, or Firm* — Eschweiler & Potashnik, LLC

(57) ABSTRACT

Disclosed herein are timing determination techniques for 5G radio access network (RAN) cells. According to various such techniques, during a random access procedure, a user equipment (UE) may receive a grant of resources for an uplink (UL) data transmission in a random access response (RAR) message. The UE may identify a scheduled slot for the UL data transmission based on a received slot of the RAR message and an applicable slot offset value. The applicable slot offset value may indicate a number of slots by which the received slot precedes the scheduled slot. The applicable slot offset value may be identified using the various techniques described herein.

17 Claims, 24 Drawing Sheets

Related U.S. Application Data

(60) Provisional application No. 62/475,054, filed on Mar. 22, 2017.

(51) Int. Cl.
    *H04W 74/0833*     (2024.01)
    *H04W 76/27*     (2018.01)

(58) Field of Classification Search
    USPC .......................................................... 370/336
    See application file for complete search history.

(56) References Cited

U.S. PATENT DOCUMENTS

| | | |
|---|---|---|
| 2012/0113938 A1* | 5/2012 | Larsson .............. H04W 74/008 370/329 |
| 2012/0243499 A1 | 9/2012 | Moon |
| 2013/0114472 A1 | 5/2013 | Tamaki |
| 2017/0013643 A1 | 1/2017 | Nan |
| 2018/0007543 A1 | 1/2018 | Lee et al. |
| 2018/0220468 A1 | 8/2018 | Lin |
| 2019/0281636 A1* | 9/2019 | Liu ........................ H04W 76/27 |
| 2020/0228377 A1 | 7/2020 | Papasakellariou |
| 2020/0229187 A1 | 7/2020 | Marinier |
| 2021/0258876 A1 | 8/2021 | Papasakellariou |

FOREIGN PATENT DOCUMENTS

| | | |
|---|---|---|
| WO | 2016108503 A1 | 7/2016 |
| WO | 2021035300 A1 | 3/2017 |

OTHER PUBLICATIONS

NTT Docomo, Inc.; Discussion on initial access procedure for NR; 3GPP TSG RAN WG1 Meeting #87; R1-1612723; Nov. 14, 2016.
3rd Generation Partnership Project; Technical Specification Group Radio Access Network; Study on New Radio (NR) Access Technology Physical Layer Aspects; 3GPP TR 38.802; v1.2.0; Feb. 2017.
International Search Report and Written Opinion for the International Patent Application No. PCT/US2018/023882.
Non-Final Office Action dated Oct. 22, 2020 in connection with U.S. Appl. No. 16/488,133.
Non-Final Office Action dated Aug. 31, 2021 in connection with U.S. Appl. No. 16/488,133.
Notice of Allowance dated Apr. 25, 2022 in connection with U.S. Appl. No. 16/488,133.
Ericsson; "NB-IoT—DCI content"; 3GPP TSG-RAN1—Ad Hoc NB-IoT; R1-161821; Mar. 22, 2016.

* cited by examiner

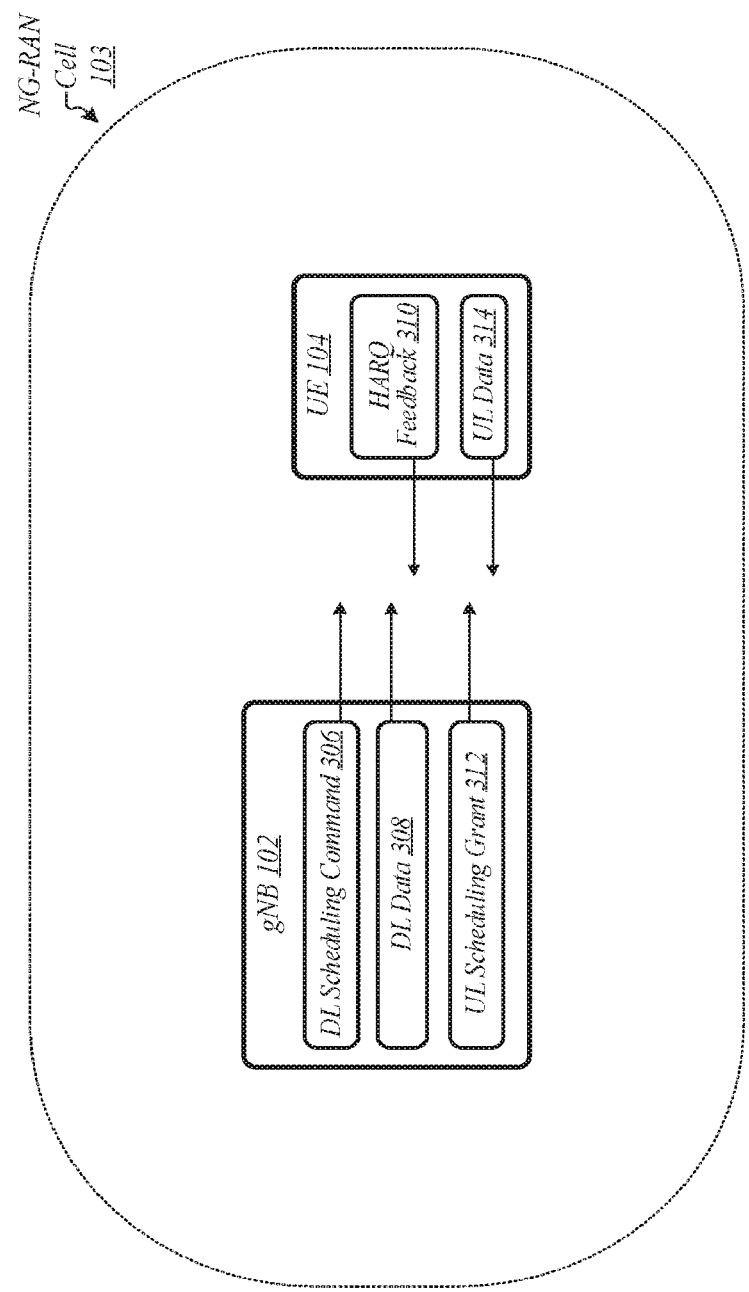

FIG. 4
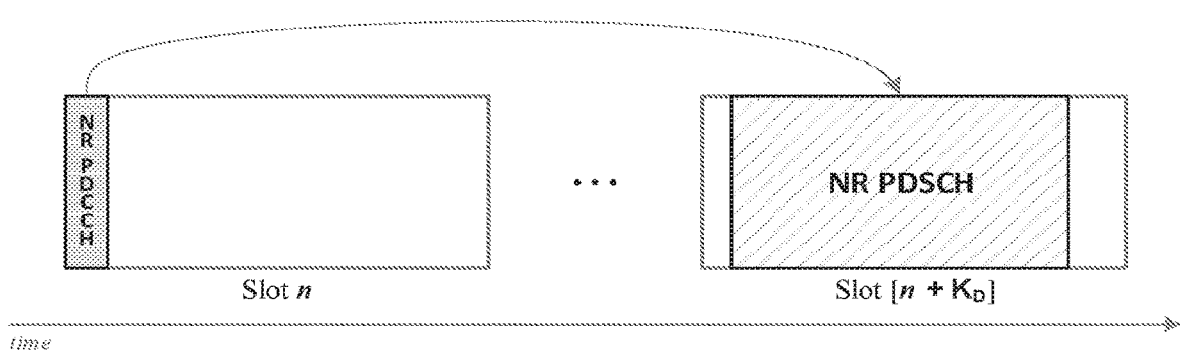
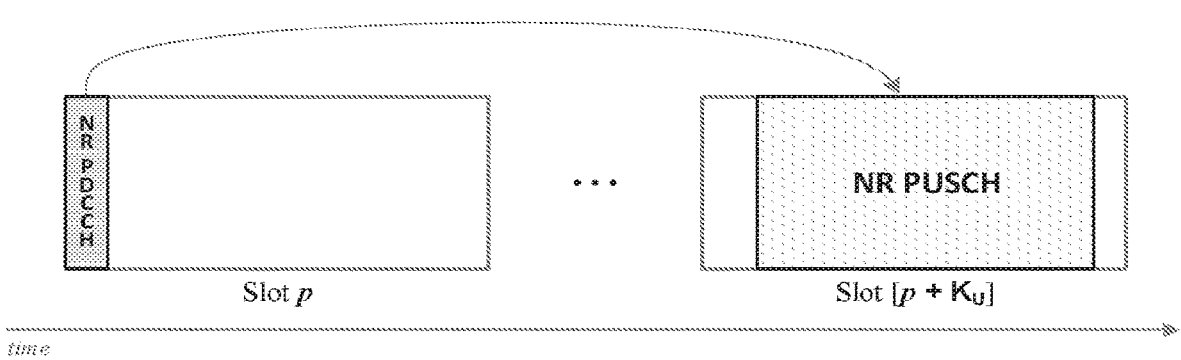
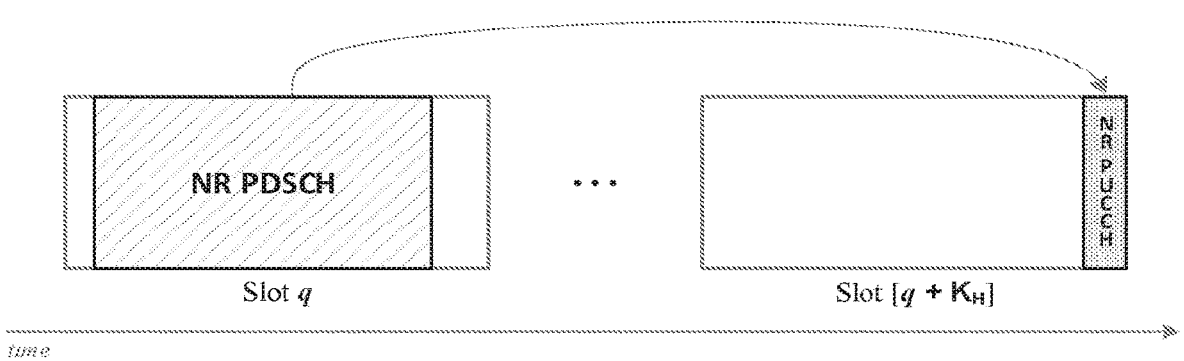

FIG. 8
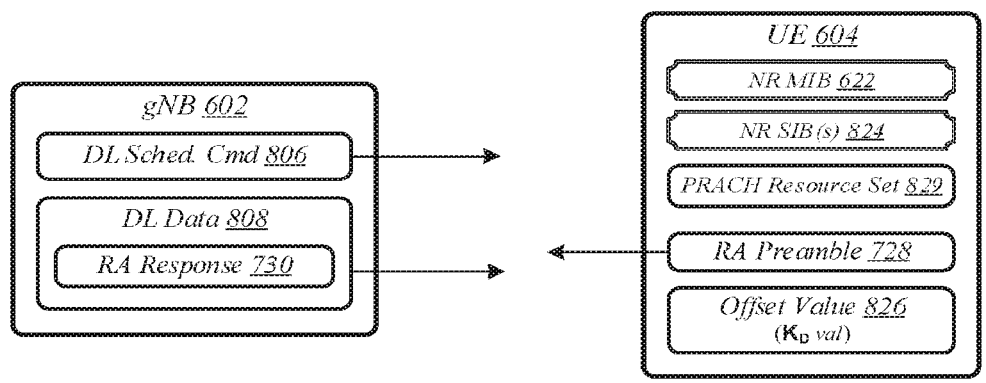
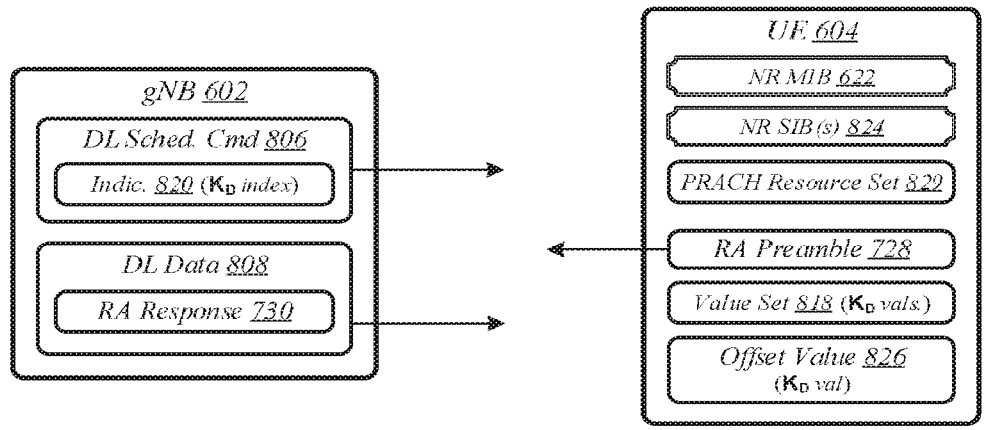

FIG. 9
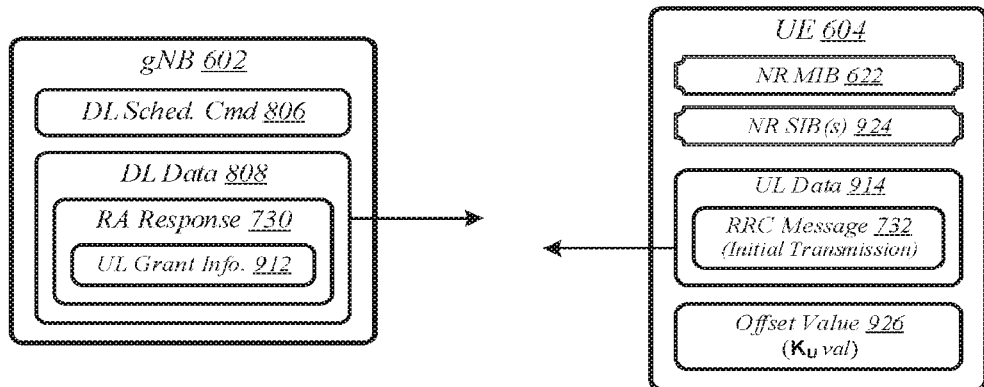
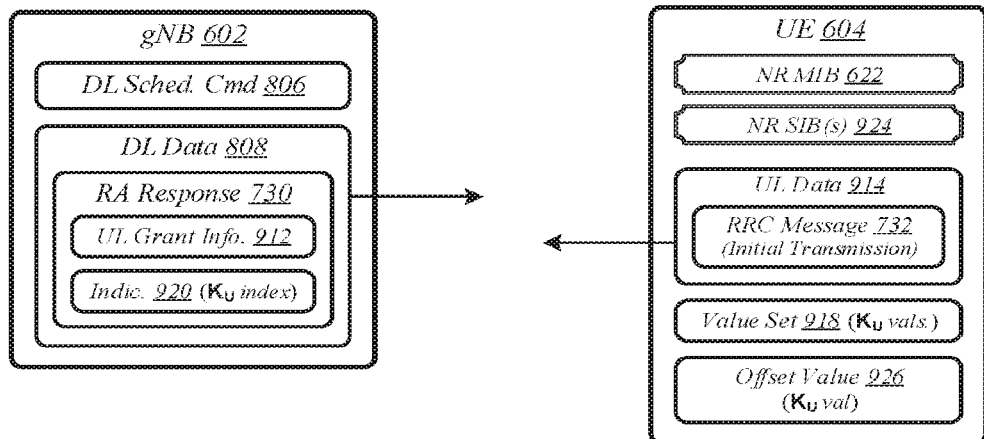
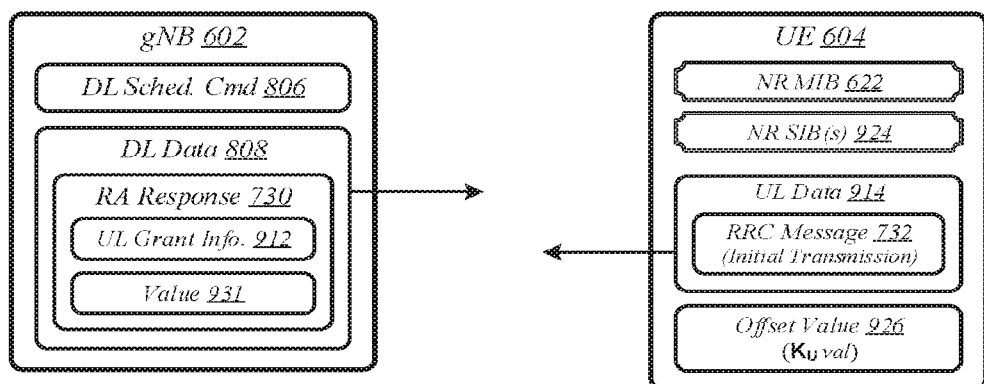

FIG. 10
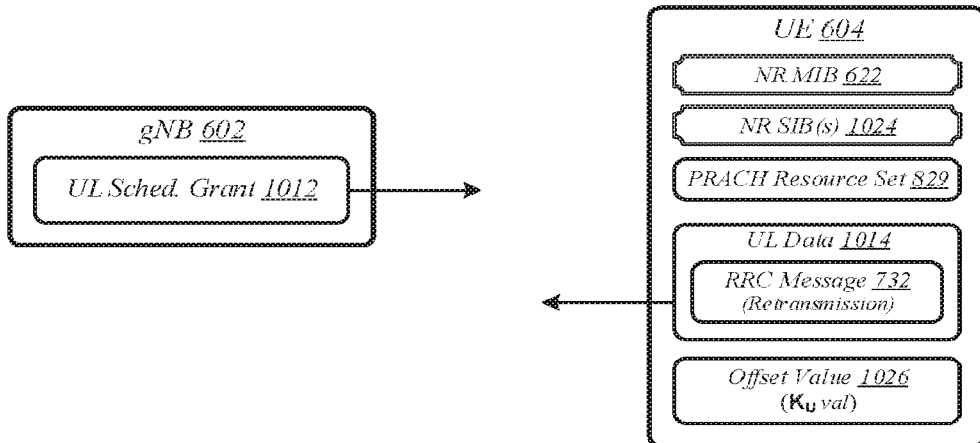
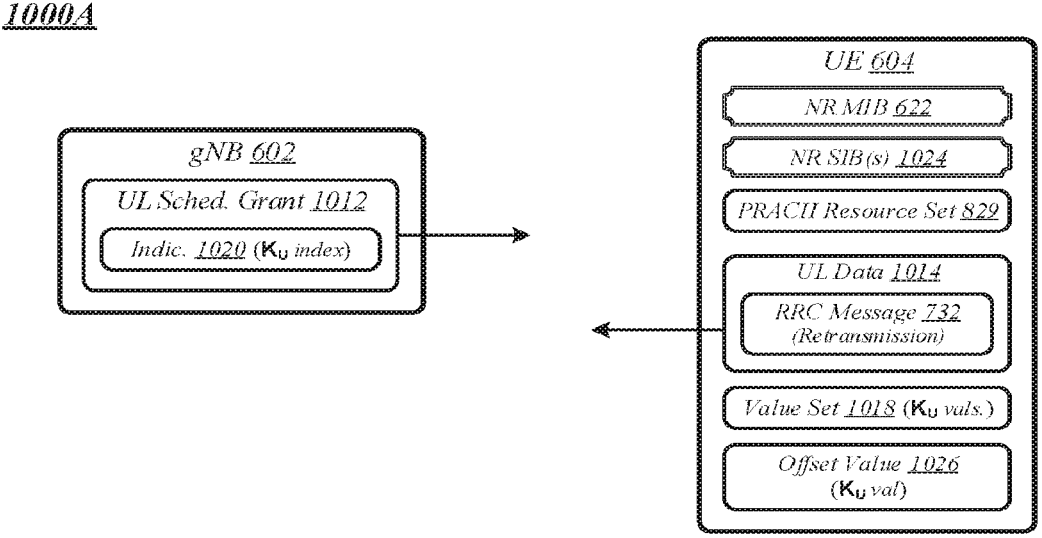
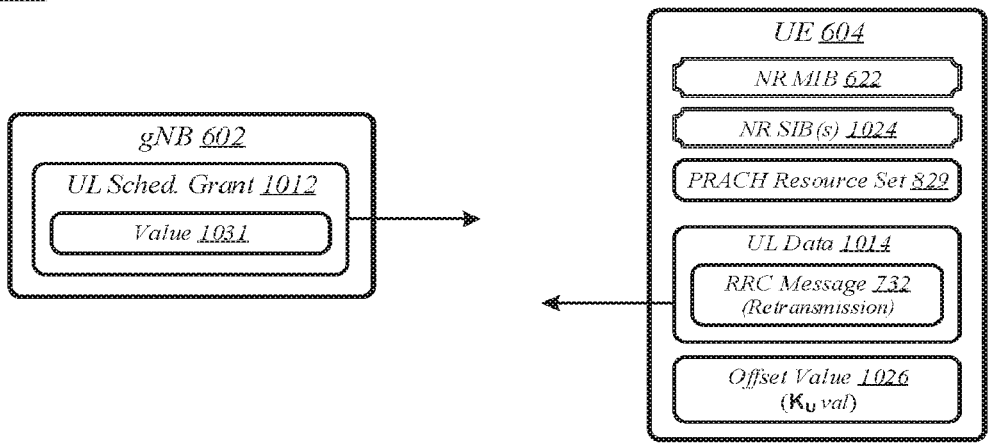

FIG. 11
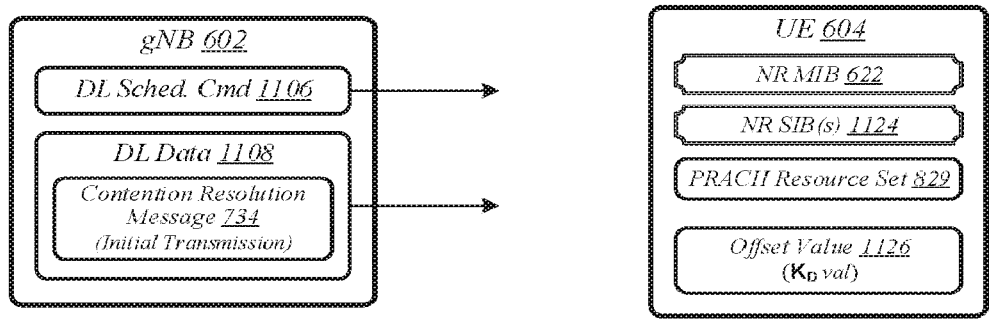
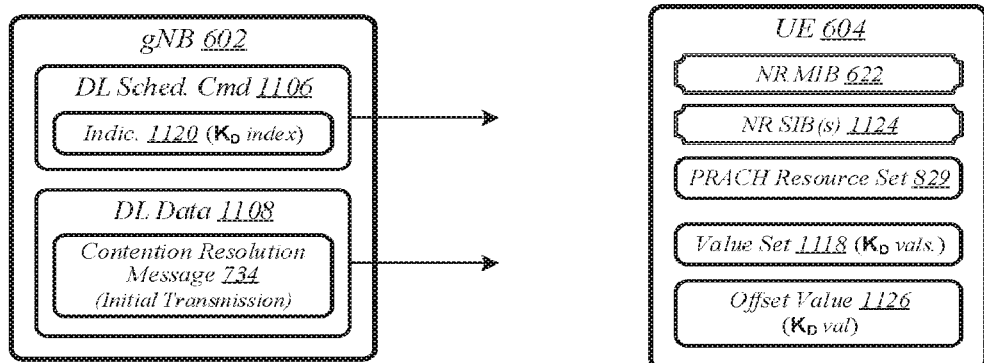
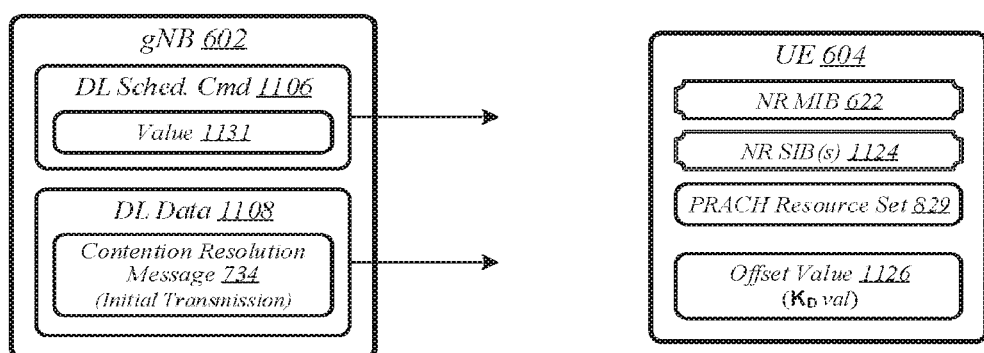

FIG. 12
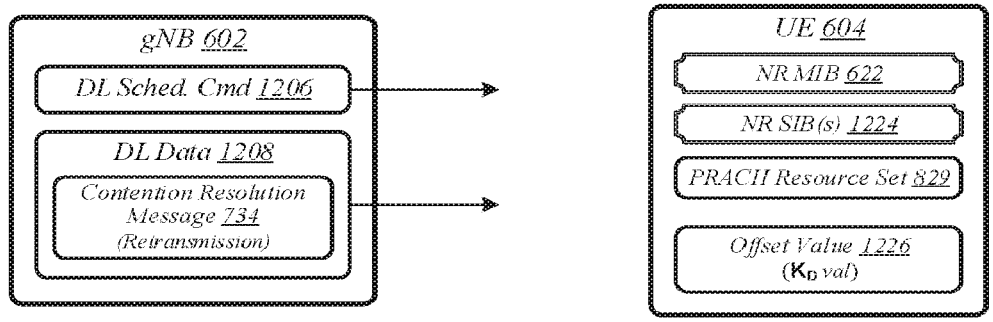
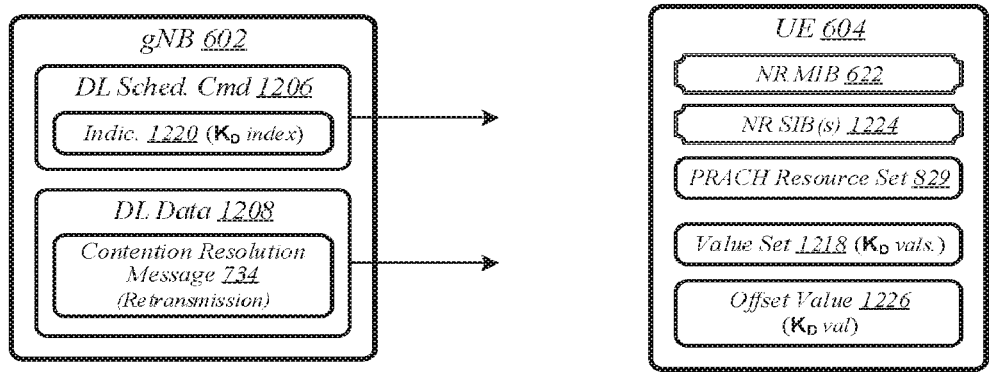
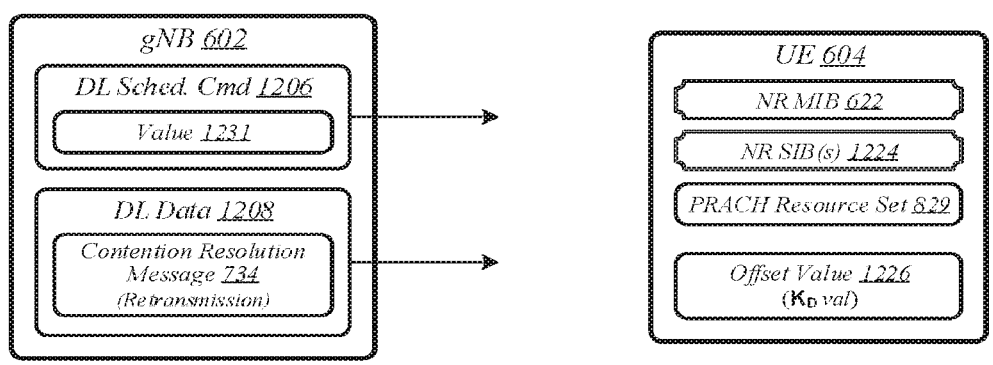

*FIG. 13*
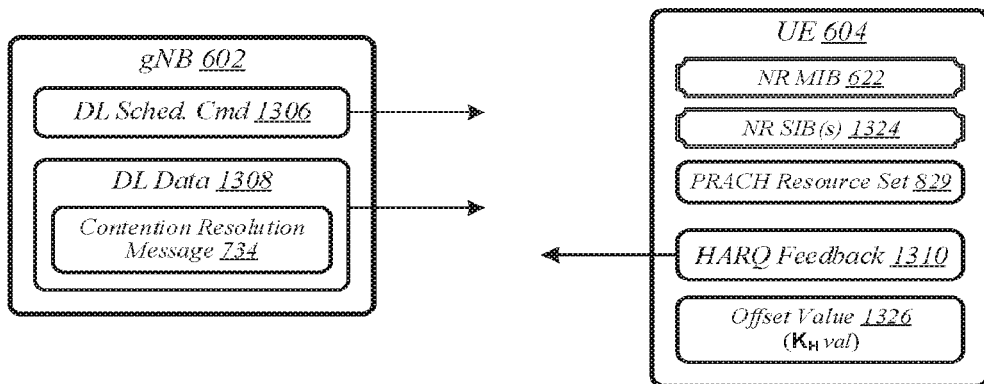
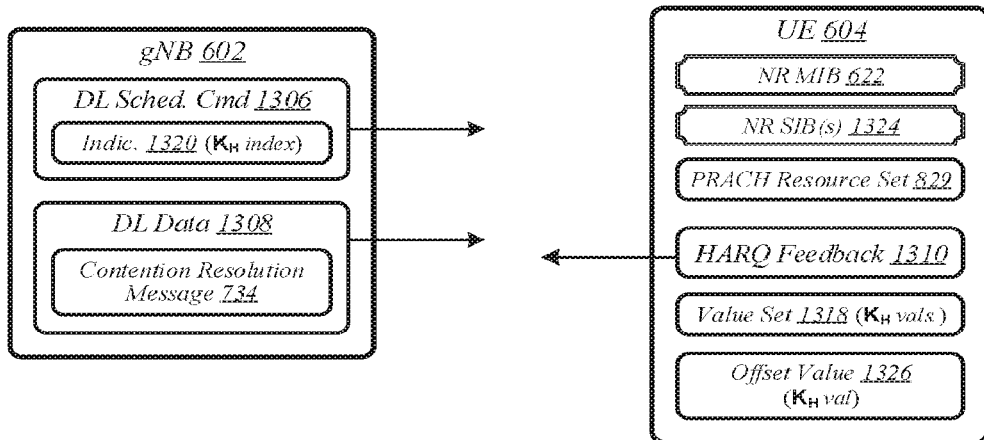
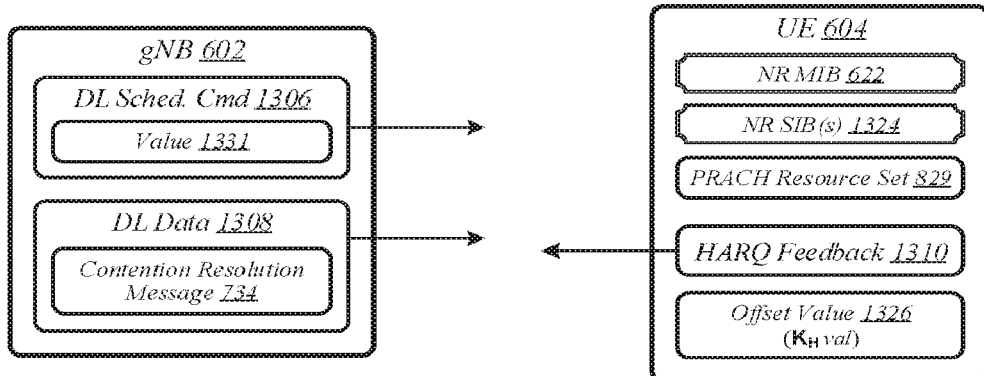

TIMING DETERMINATION TECHNIQUES FOR 5G RADIO ACCESS NETWORK CELLS

RELATED CASE

This application is a continuation of U.S. application Ser. No. 16/488,133 filed on Aug. 22, 2019, which is a National Phase entry application of International Patent Application No. PCT/US2018/023882 filed on Mar. 22, 2018, which claims priority to U.S. Provisional Application 62/475,054 filed Mar. 22, 2017, which is hereby incorporated by reference in its entirety.

TECHNICAL FIELD

Embodiments herein generally relate to communications between devices in broadband wireless communications networks.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 3 illustrates an embodiment of a second operating environment.

FIG. 4 illustrates an embodiment of a first timing diagram, an embodiment of a second timing diagram, and an embodiment of a third timing diagram.

FIG. 8 illustrates an embodiment of a fifth operating environment and an embodiment of a sixth operating environment.

FIG. 9 illustrates an embodiment of a seventh operating environment, an embodiment of an eight operating environment, and an embodiment of a ninth operating environment.

FIG. 10 illustrates an embodiment of a tenth operating environment, an embodiment of an eleventh operating environment, and an embodiment of a twelfth operating environment.

FIG. 11 illustrates an embodiment of a thirteenth operating environment, an embodiment of a fourteenth operating environment, and an embodiment of a fifteenth operating environment.

FIG. 12 illustrates an embodiment of a sixteenth operating environment, an embodiment of a seventeenth operating environment, and an embodiment of a eighteenth operating environment.

FIG. 13 illustrates an embodiment of a nineteenth operating environment, an embodiment of a twentieth operating environment, and an embodiment of a twenty-first operating environment.

DETAILED DESCRIPTION

Figure 1:
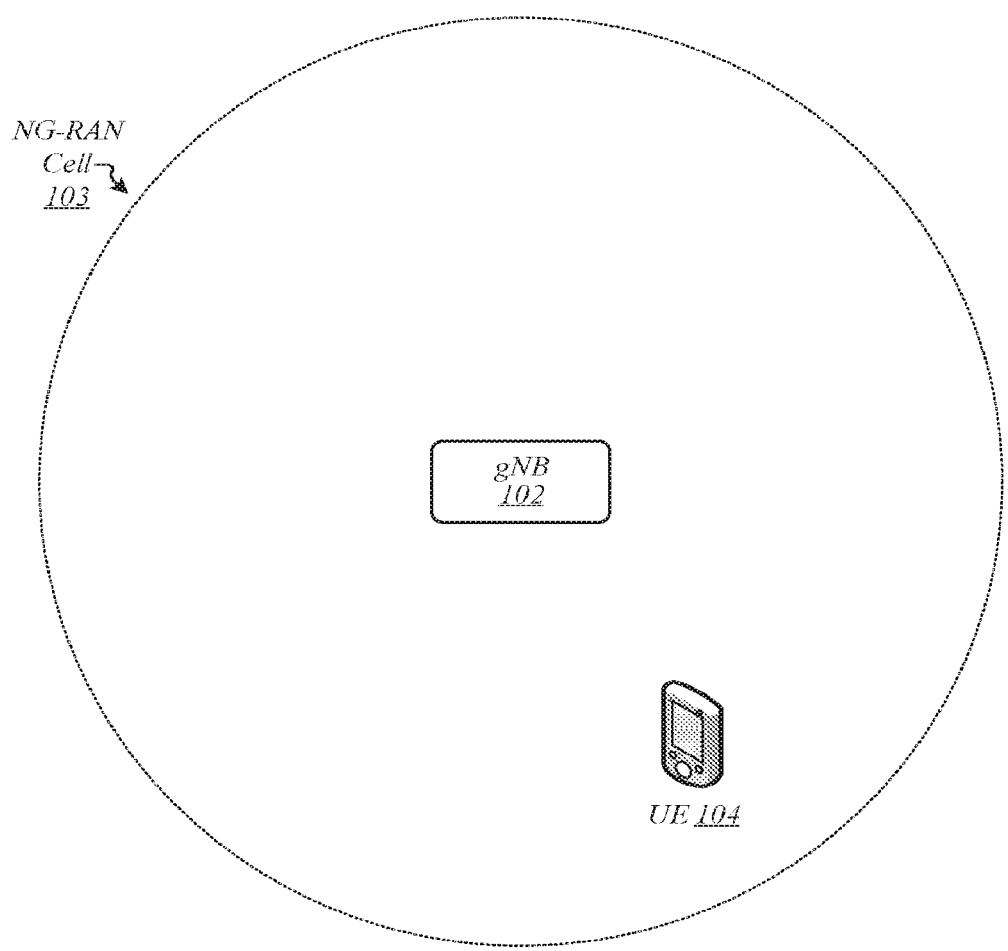
FIG. 1 illustrates an embodiment of a first operating environment.

Timing determination techniques for 5G radio access network cells are described. According to various such techniques, during a random access procedure in a 5G cell, user equipment (UE) may determine slot offset values applicable to various transmissions associated with the random access procedure using procedures that do not rely on UE-specific radio resource control (RRC) signaling. According to some such techniques, during system information acquisition in a 5G cell, a UE may determine applicable slot offset values for one or more system information block (SIB) transmissions using procedures that do not rely on UE-specific radio resource control (RRC) signaling. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), 3GPP LTE-Advanced (LTE-A), 3GPP LTE-Advanced Pro, and/or 3GPP fifth generation (5G)/new radio (NR) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.114 IEEE 802.11ah, IEEE 802.11ax, IEEE 802.11ay, and/or IEEE 802.11y standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any revisions, progeny, and/or variants of any of the above. The embodiments are not limited to these examples.

FIG. 1 illustrates an example of an operating environment 100 that may be representative of various embodiments. In operating environment 100, a next generation node B (gNB) 102 serves a next generation radio access network (NG-RAN) cell 103. NG-RAN cell 103 may generally be representative of a radio access network cell within which wireless communications are performed in accordance with 3rd Generation Partnership Project (3GPP) fifth generation (5G) new radio (NR) radio interface protocols. User equipment (UE) 104 located within NG-RAN cell 103 may wirelessly communicate with gNB 102 according to such protocols in conjunction with establishing and utilizing wireless data connectivity via gNB 102.

In various embodiments, gNB 102 and UE 104 may be capable of utilizing one or more self-contained time-division duplex (TDD) slot structures in conjunction with wirelessly communicating in NG-RAN cell 103. Each such self-contained TDD slot structure may generally comprise a structure according to which both DL and UL sub-intervals are present within the same slot. In various embodiments, gNB 102 and UE 104 may be capable of utilizing at least one self-contained TDD slot structure in conjunction with downlink (DL) communications. In various embodiments. gNB 102 and UE 104 may additionally or alternatively be capable of utilizing at least one self-contained TDD slot structure in conjunction with uplink (UL) communications. It is worthy of note that NG-RAN cell 103 need not necessarily be a TDD cell in order to implement one or more self-contained TDD slot structures. While NG-RAN cell 103 may be a TDD cell in some embodiments, in other embodiments it may be an FDD cell, or a cell that implements another duplexing scheme other than TDD. The embodiments are not limited in this context.

Figure 2A:
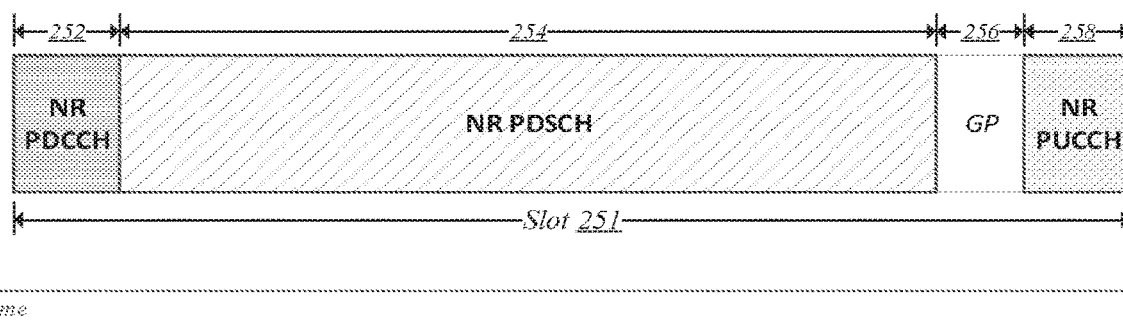
FIG. 2A illustrates an embodiment of a first slot structure.

FIG. 2A illustrates a DL data slot structure 250 that may be representative of the implementation of a self-contained TDD slot structure for low-latency DL data communications according to various embodiments. As shown in FIG. 2A, according to DL data slot structure 250, a first sub-interval 252 of a slot 251 is designated as a time interval during which DL control communications may be performed, such as communications over an NR physical downlink control channel (PDCCH). Sub-interval 252 is followed by sub-interval 254, which is designated as a time interval during which DL data communications may be performed, such as communications over an NR physical downlink shared channel (PDSCH). Sub-interval 254 is followed by sub-interval 256, which is designated as a guard period (GP). Sub-interval 256 is followed by sub-interval 258, which is designated as a time interval during which UL control communications may be performed, such as communications over an NR physical uplink control channel (PUCCH). The embodiments are not limited to this example.

Figure 2B:
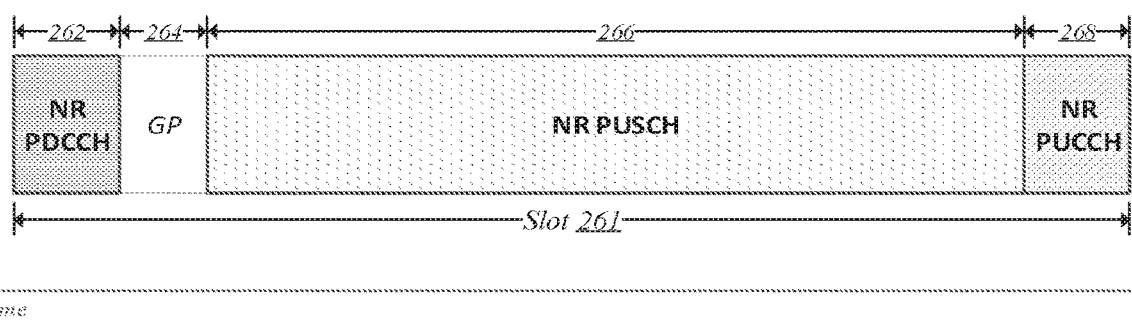
FIG. 2B illustrates an embodiment of a second slot structure.

FIG. 2B illustrates a UL data slot structure 260 that may be representative of the implementation of a self-contained TDD slot structure for low-latency UL data communications according to various embodiments. As shown in FIG. 2B, according to UL data slot structure 260, a first sub-interval 262 of a slot 261 is designated as a time interval during which DL control communications may be performed, such as communications over an NR PDCCH. Sub-interval 262 is followed by sub-interval 264, which is designated as a guard period. Sub-interval 264 is followed by sub-interval 266, which is designated as a time interval during which UL data communications may be performed, such as communications over an NR physical uplink shared channel (PUSCH). Sub-interval 266 is followed by sub-interval 268, which is designated as a time interval during which UL control communications may be performed, such as communications over an NR PUCCH. The embodiments are not limited to this example.

In operating environment 100, the use of DL data slot structure 250 may enable DL communications with reduced associated latencies. For example, the use of DL data slot structure 250 may make it possible for gNB 102 and UE 104 to complete an exchange of a DL scheduling command, a corresponding DL data transmission, and hybrid automatic repeat request (HARQ) feedback for the DL data transmission within a same slot. Likewise, the use of UL data slot structure 260 may enable UL communications with reduced associated latencies. For example, the use of UL data slot structure 260 may make it possible for gNB 102 and UE 104 to complete an exchange of a UL scheduling grant and a corresponding UL data transmission within a same slot.

FIG. 3 illustrates an example of an operating environment 300 that may be representative of various embodiments. In operating environment 300, in conjunction with exchanging DL and UL communications with each other, gNB 102 and UE 104 may utilize DL data slot structure 250 and UL data slot structure 260, respectively. As shown in FIG. 3, gNB 102 may transmit a DL scheduling command 306 to UE 104 in order to schedule a subsequent transmission of DL data 308 to UE 104. UE 104 may provide HARQ feedback for DL data 308 by transmitting HARQ feedback 310 to gNB 102. In some cases, it may be desirable for gNB 102 to perform same-slot scheduling of the transmission of DL data 308 in order to minimize latency associated with transmission of DL data 308. In the context of DL data slot structure 250, such same-slot scheduling may involve transmission of DL scheduling command 306 during sub-interval 252 of slot 251 in order to schedule transmission of DL data 308 during sub-interval 254 of that same slot 251. In other cases, it may be preferable that gNB 102 instead perform cross-slot scheduling of the transmission of DL data 308. Such cross-slot scheduling may involve transmission of DL scheduling command 306 during a given slot to schedule DL data 308 for transmission during a subsequent slot. Similarly, in some cases, it may be desirable that UE 104 transmit HARQ 310 with minimal latency—possibly even during the same slot as the transmission of DL data 308—while in other cases, it may be desirable that transmission of HARQ 310 follow transmission of DL data 308 by one or more slots.

As shown in FIG. 3, gNB 102 may transmit a UL scheduling grant 312 to UE 104 in order to grant UL channel resources to UE 104 for use in conjunction with a subsequent UL data transmission. In the context of operating environment 300, that UL data transmission may involve transmission of UL data 314 by UE 104. In some cases, in order to minimize latency associated with the UL data transmission, it may be desirable that UL scheduling grant 312 constitute a same-slot grant. In the context of UL data slot structure 260, if UL scheduling grant 312 constitutes a same-slot grant, then UL scheduling grant 312 may be transmitted during sub-interval 262 of slot 261 in order to grant UL channel resources for use in conjunction with UL data transmission during sub-interval 266 of that same slot 261. In other cases, it may be preferable that UL scheduling grant 312 constitute a cross-slot grant, such that UL scheduling grant 312 is transmitted during a given slot in order to grant UL channel resources for use in conjunction with UL data transmission during a subsequent slot.

In various embodiments, in support of protocols providing flexibility regarding the scheduling of DL data transmissions in conjunction with the use of self-contained TDD slot structures, gNB 102 and UE 104 may be configured to recognize, understand, and apply a DL data timing offset parameter (hereinafter, "$K_D$"). In various embodiments, with respect to a given DL scheduling command, gNB 102 and UE 104 may be configured to understand the applicable value of $K_D$ as an indication of a slot offset value representing a number of slots by which that DL scheduling command precedes the DL data transmission that it schedules. In the context of a given DL data transmission, same-slot scheduling may correspond to an applicable $K_D$ value of 0, while cross-slot scheduling may correspond to an applicable $K_D$ value greater than 0.

In various embodiments, in support of protocols providing flexibility regarding the scheduling of UL data transmissions in conjunction with the use of self-contained TDD slot structures, gNB 102 and UE 104 may be configured to recognize, understand, and apply a UL data timing offset parameter (hereinafter, "$K_U$"). In various embodiments, with respect to a given UL scheduling grant, gNB 102 and UE 104 may be configured to understand the applicable value of $K_U$ as an indication of a slot offset value representing a number of slots by which that UL scheduling grant precedes the expected UL data transmission for which it grants UL channel resources. With respect to UL data transmission performed using UL channel resources allocated via a same-slot grant, the applicable value of $K_U$ may be 0. With respect to UL data transmission performed using UL channel resources allocated via a cross-slot grant, the applicable value of $K_U$ may be greater than 0.

In various embodiments, in support of protocols providing flexibility regarding HARQ feedback timing for DL data transmissions in conjunction with the use of self-contained TDD slot structures, gNB 102 and UE 104 may be configured to recognize, understand, and apply a HARQ feedback timing offset parameter (hereinafter, "$K_H$"). In various embodiments, with respect to a given DL data transmission, gNB 102 and UE 104 may be configured to understand the applicable value of $K_H$ as an indication of a slot offset value representing a number of slots by which that DL data transmission precedes the transmission of the HARQ feedback for that DL data transmission. In the context of a given DL data transmission and the HARQ feedback for that DL data transmission, a $K_U$ value of 0 may indicate that the HARQ feedback is to be transmitted during the same slot as was the DL data, a $K_H$ value of 1 may indicate that the HARQ feedback is to be transmitted during an immediately subsequent slot, and so forth.

FIG. 4 depicts timing diagrams 400, 450, and 490 comprising visual illustrations of the meanings of DL data timing offset parameter $K_D$, UL data timing offset parameter $K_U$, and HARQ feedback timing offset parameter $K_H$, respectively. As illustrated by the arrow in timing diagram 400, if a DL data transmission over an NR PDSCH is scheduled via downlink control information (DCI) transmitted over an NR PDCCH during a slot n, then that DL data transmission is to be performed during a slot [n+$K_D$]. As illustrated by the arrow in timing diagram 450, if a UL data transmission over an NR PUSCH is performed using resources granted via DCI transmitted over an NR PDCCH during a slot p, then that UL data transmission is to be performed during a slot [p+$K_U$]. As illustrated by the arrow in timing diagram 490, with respect to a DL data transmission performed during a slot q, the associated HARQ feedback is to be transmitted during a slot [q+$K_H$]. The embodiments are not limited to these examples.

In order to receive DL data 308 in operating environment 300, UE 104 needs to correctly identify the slot during which DL data 308 is to be transmitted on the NR PDSCH. In order to identify that slot, UE 104 may need to determine a value of $K_D$ that applies with respect to the transmission of DL data 308. In order to enable gNB 102 to receive HARQ feedback 310, UE 104 needs to correctly identify the slot during which HARQ feedback 310 is to be transmitted on the NR PDCCH. In order to identify that slot, UE 104 may need to determine a value of $K_H$ that applies with respect to the transmission of HARQ feedback 310. In order to enable gNB 102 to receive UL data 314, UE 104 needs to correctly identify the slot during which UL data 314 is to be transmitted on the NR PUSCH. In order to identify that slot, UE 104 may need to determine a value of $K_U$ that applies with respect to the transmission of UL data 314.

Figure 5:
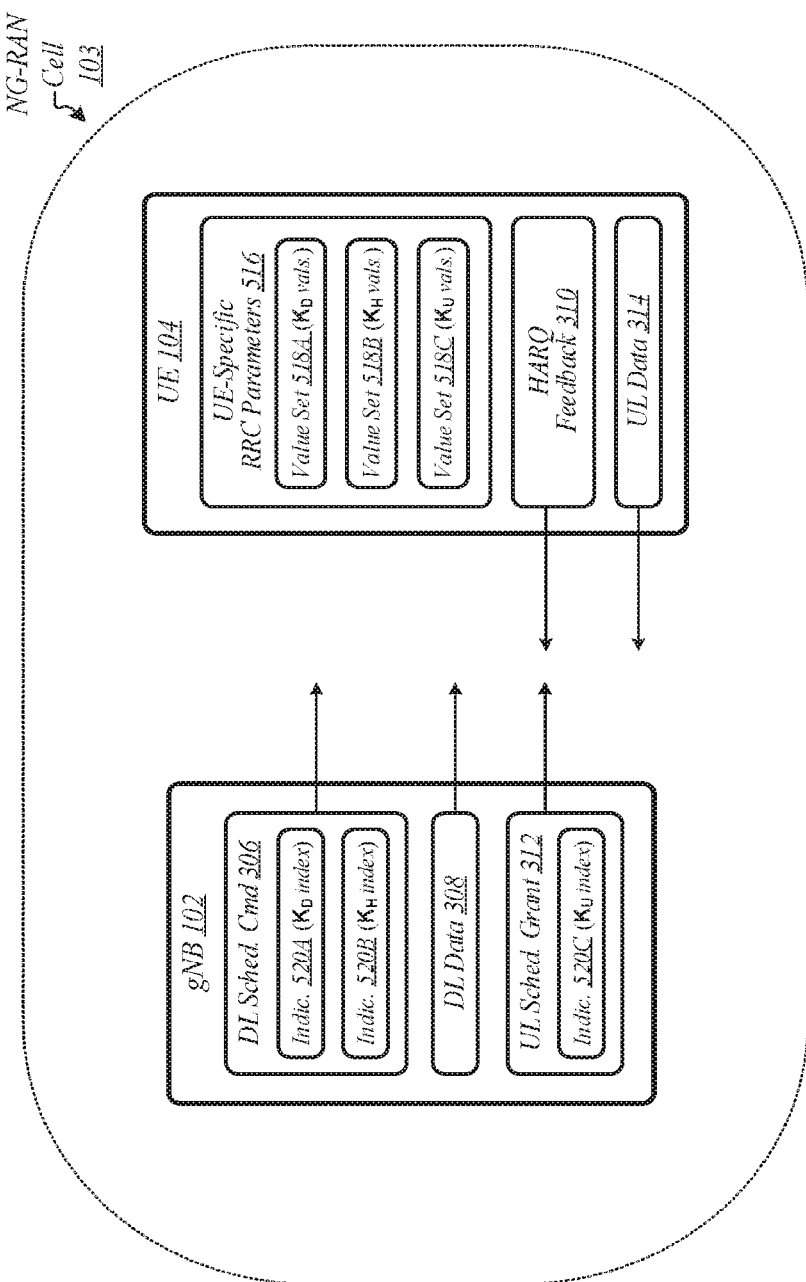
FIG. 5 illustrates an embodiment of a third operating environment.

FIG. 5 illustrates an operating environment 500 that may be representative of various embodiments. In operating environment 500, RRC connectivity may exist between UE 104 and gNB 102. RRC connectivity with UE 104 may enable gNB 102 to use UE-specific RRC signaling to configure UE 104 with various types of UE-specific RRC parameters 516. In various embodiments, gNB 102 may use UE-specific RRC signaling to configure UE 104 with UE-specific RRC parameters 516 that include value sets 518A, 518B, and 518C. In various embodiments, value set 518A may represent a UE-specific set of possible values of $K_D$. In various embodiments, value set 518B may represent a UE-specific set of possible values of $K_H$. In various embodiments, value set 518C may represent a UE-specific set of possible values of $K_U$.

Subsequently, in order to notify UE 104 of the value of $K_D$ that applies to transmission of DL data 308, gNB 102 may include an indicator 520A in the DL scheduling command 306 that it transmits in order to schedule transmission of DL data 308. Indicator 520A may comprise information, such as an index value, that points to a particular value within value set 518A, and UE 104 may identify that particular value as the applicable value of $K_D$ with respect to transmission of DL data 308. In order to notify UE 104 of the value of $K_H$ that applies to transmission of HARQ feedback 310, gNB 102 may include an indicator 520B in the DL scheduling command 306 that it transmits in order to schedule transmission of DL data 308. Indicator 520B may comprise information, such as an index value, that points to a particular value within value set 518B, and UE 104 may identify that particular value as the applicable value of $K_H$ with respect to transmission of HARQ feedback 310. In order to notify UE 104 of the value of $K_U$ that applies to transmission of UL data 314, gNB 102 may include an indicator 520C in the UL scheduling grant 312 that it transmits in order to grant UL channel resources to UE 104 for use in conjunction with UL data transmission. Indicator 520C may comprise information, such as an index value, that points to a particular value within value set 518C, and UE 104 may identify that particular value as the applicable value of $K_U$ with respect to transmission of UL data 314.

In the absence of an RRC connection between UE 104 and gNB 102, it may not be possible for gNB 102 to configure UE 104 with UE-specific RRC parameters 516 such as value sets 518A, 518B, and 518C. As such, the procedures that UE 104 uses in operating environment 500 in order to identify applicable $K_D$, $K_H$, and $K_U$ values for the various aforementioned transmissions may not be usable for timing determinations associated with transmissions that occur prior to establishment of RRC connectivity between UE 104 and gNB 102. Thus, if these procedures constitute the only procedures known to UE 104 for determining applicable $K_D$, $K_H$, and $K_U$ values, UE 104 may be unable to complete the processes of system information acquisition and random access in NG-RAN cell 103.

Disclosed herein are timing determination techniques for system information acquisition and random access in 5G RAN cells. According to such techniques, a UE such as UE 104 may generally be operative to determine applicable $K_D$, $K_H$, and $K_U$ values using procedures that do not rely on UE-specific RRC signaling. In various embodiments, during system information acquisition in a 5G RAN cell such as NG-RAN cell 103, the UE may determine applicable $K_D$ values for one or more system information block (SIB) transmissions without reference to any UE-specific RRC parameters. In various embodiments, during a random access procedure in the 5G RAN cell, the UE may identify values of $K_D$, $K_H$, and $K_U$ that apply to various transmissions without reference to any UE-specific RRC parameters. In various embodiments, the UE may conduct the system information acquisition and initiate the random access procedure in conjunction with an initial access process, such as it may perform upon being powered up within the 5G RAN cell. In various other embodiments, the UE may conduct the system information acquisition and initiate the random access procedure in conjunction with an RRC reconfiguration process, such as may be performed in conjunction with a handover of the UE to the 5G RAN cell from another cell. The embodiments are not limited in this context.

Figure 6:
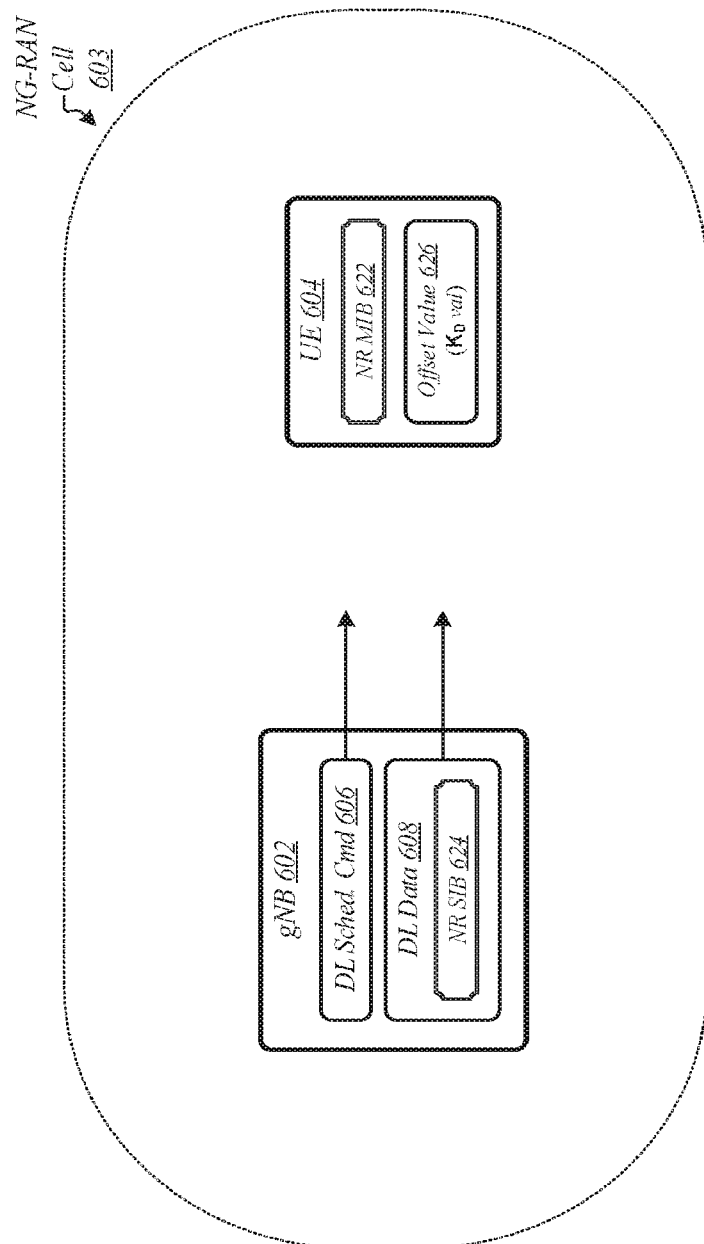
FIG. 6 illustrates an embodiment of a fourth operating environment.

FIG. 6 illustrates an example of an operating environment 600 that may be representative of the implementation of one or more of the disclosed timing determination techniques according to various embodiments. In operating environment 600, a UE 604 may enter an NG-RAN cell 603 served by a gNB 602. In various embodiments, in order to obtain system information that it requires for proper operation within NG-RAN cell 603, UE 604 may initiate a system information acquisition process. In various embodiments, in conjunction with the system information acquisition process, UE 604 may acquire an NR master information block (MIB) 622 for NG-RAN cell 603. In various embodiments, gNB 602 may broadcast the NR MIB 622 over an NR physical broadcast channel (PBCH) of NG-RAN cell 603. In various embodiments, NR MIB 622 may comprise information that, once known to UE 604, enables UE 604 to begin accessing an NR PDCCH of NG-RAN cell 603. In various embodiments, once it is able to access the NR PDCCH, UE 604 may begin monitoring the NR PDCCH for DCI comprising a format associated with the scheduling of system information block (SIB) transmissions.

In various embodiments, by monitoring the NR PDCCH, UE 604 may detect a DL scheduling command 606 that gNB 602 transmits during a slot $S_{606}$. In various embodiments, DL scheduling command 606 may comprise downlink control information that gNB 602 transmits over the NR PDCCH to schedule transmission of DL data 608 comprising an NR SIB 624. In various embodiments, gNB 602 may transmit DL data 608 over an NR PDSCH of NG-RAN cell 603. In various embodiments, gNB 602 may transmit DL data 608 over an NR PDSCH during a slot Sous, which may or may not be a different slot than slot $S_{606}$. In various embodiments, in order to acquire NR SIB 624, UE 604 may need to identify the slot $S_{608}$ during which to access the NR PDSCH and obtain the DL data 608 comprising NR SIB 624. In various embodiments, UE 604 may identify an offset value 626 that constitutes an applicable value of $K_D$ with respect to the transmission of DL data 608, and may identify slot $S_{608}$ based on the identity of slot $S_{606}$ and on the identified offset value 626.

In various embodiments, offset value 626 may correspond to a value indicated in NR MIB 622. In various embodiments, offset value 626 may correspond to a value indicated in an NR SIB acquired prior to receipt of the DL scheduling command 606 associated with NR SIB 624. In various embodiments, DL scheduling command 606 may comprise a direct indication of offset value 626. In various embodiments, UE 604 may be configured to regard a particular fixed value as constituting the applicable $K_D$ value with respect to DL data transmissions that carry NR SIBs, and offset value 626 may correspond to that fixed value. In various embodiments, for example, UE 604 may be configured to regard the applicable $K_D$ value to be fixed at 0 with respect to DL data transmissions that carry NR SIBs, and offset value 626 may thus be equal to 0. The embodiments are not limited to this example.

Figure 7:
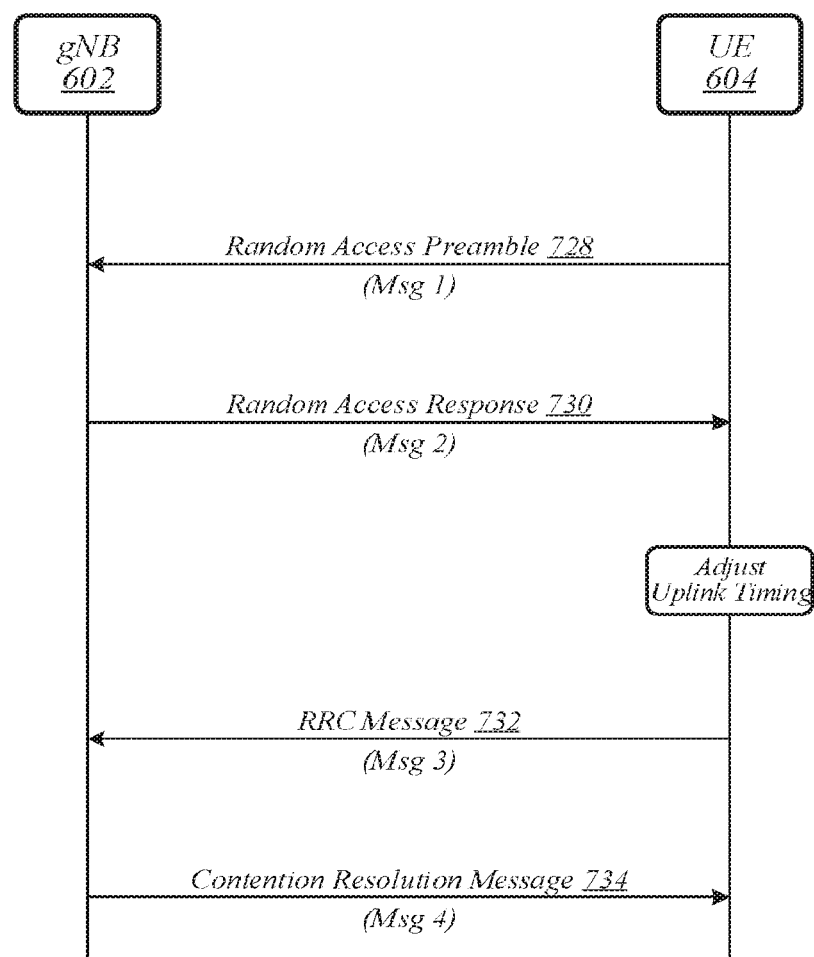
FIG. 7 illustrates an embodiment of a communications flow.

FIG. 7 illustrates an example of a communications flow 700 that may be representative of communications between gNB 602 and UE 604 according to various embodiments. More particularly, communications flow 700 may be representative of communications associated with a random access procedure that LIE 604 may initiate while located within NG-RAN cell 603 in operating environment 600 of FIG. 6. In various embodiments, UE 604 may initiate the random access procedure in conjunction with an initial access process. In an example embodiment, UE 604 may be powered up within NG-RAN cell 603, perform cell acquisition, and then initiate the random access procedure. In various other embodiments, UE 604 may initiate the random access procedure in conjunction with an RRC reconfiguration process. In an example embodiment, UE 604 may initiate the random access procedure in conjunction with RRC reconfiguration associated with a handover of UE 604 to NG-RAN cell 603 from another cell. The embodiments are not limited to these examples.

According to communications flow 700, UE 604 may transmit a random access preamble 728 in order to initiate the random access procedure. In response to receipt of random access preamble, gNB 602 may send a random access response 730 to UE 604. As illustrated in FIG. 7, following receipt of random access response 730, UE 604 may adjust its uplink timing and then send a radio resource control (RRC) message 732 to gNB 602. In response to RRC message 732, gNB 602 may send a contention resolution message 734 to UE 604.

FIG. 8 illustrates an example of an operating environment 800 that may be representative of the implementation of one or more of the disclosed timing determination techniques according to various embodiments. In operating environment 800, while located within the NG-RAN cell 603 (not pictured in FIG. 8) served by gNB 602, UE 604 may transmit random access preamble 728 in order to initiate a random access procedure. In various embodiments, as of the time of transmission of random access preamble 728, UE 604 may have acquired the NR MIB 622 for NG-RAN cell 603 and one or more NR SIBs 824 for NG-RAN cell 603. In various embodiments, UE 604 may transmit random access preamble 728 over an NR physical random access channel (PRACH) of NG-RAN cell 603. In various embodiments, UE 604 may randomly select a PRACH resource and transmit random access preamble 728 via that randomly-selected PRACH resource. In various embodiments, UE 604 may generate random access preamble 728 based on a preamble sequence that it randomly selects. For example, according to various embodiments, when initiating the random access procedure in conjunction with an initial access process, UE 604 may randomly select a preamble sequence and generate random access preamble 728 based on that randomly-selected preamble sequence. In various other embodiments, UE 604 may generate random access preamble 728 based on a preamble sequence that gNB 602 has reserved for use by UE 604. For example, according to various embodiments, UE 604 may generate random access preamble 728 based on a reserved preamble sequence when initiating the random access procedure in conjunction with an RRC configuration process. The embodiments are not limited in this context.

In various embodiments, in response to receipt of random access preamble 728, gNB 602 may send random access response 730 to UE 604. In various embodiments, gNB 602 may transmit a DL scheduling command 806 during a slot $S_{806}$ in order to schedule transmission, during a slot $S_{808}$, of DL data 808 comprising random access response 730, where slot $S_{808}$ may or may not be a different slot than slot $S_{806}$. In various embodiments, UE 604 may identify an offset value 826 that constitutes an applicable value of $K_D$ with respect to the transmission of DL data 808, and may identify slot $S_{808}$ based on the identity of slot $S_{806}$ and on the identified offset value 826.

In various embodiments, offset value 826 may correspond to a value indicated in NR MIB 622 or a value indicated in an NR SIB 824. In various embodiments, DL scheduling command 806 may comprise a direct indication of offset value 826. In various embodiments, UE 604 may be configured to regard a particular fixed value as constituting the applicable $K_D$ value with respect to DL data transmissions that carry random access responses, and offset value 826 may correspond to that fixed value. In various embodiments, for example, UE 604 may be configured to regard the applicable $K_D$ value to be fixed at 0 with respect to DL data transmissions that carry random access responses, and offset value 826 may thus be equal to 0. The embodiments are not limited to this example.

In various embodiments, gNB 602 may define one or more PRACH resource sets, any given one of which may generally comprise a subset of the collective set of PRACH resources in NG-RAN cell 603. In various embodiments, different PRACH resource sets may be multiplexed using one or more of time-division multiplexing (TDM), frequency-division multiplexing (FDM), and code-division multiplexing (CDM). In various embodiments, UE 604 may be configured with knowledge of the defined PRACH resource sets via information comprised in NR MIB 622 or an NR SIB 824. In various embodiments, based on such information, UE 604 may determine that the randomly-selected PRACH resource used to transmit random access preamble 728 is comprised in a PRACH resource set 829. In various embodiments, NR MTB 622 or an NR STB 824 may comprise information designating a particular value as constituting the applicable $K_D$ value with respect to DL data transmissions that carry random access responses sent in reply to random access preamble transmission via PRACH resources comprised in PRACH resource set 829, and offset value 826 may correspond to that particular value. The embodiments are not limited in this context.

FIG. 8 additionally illustrates an example of an operating environment 800A. In operating environment 800A, UE 604 may identify a value set 818 comprising two or more possible $K_D$ values, and identify one such value as constituting offset value 826 based on an indicator 820 comprised in DL scheduling command 806. In various embodiments, value set 818 may comprise a predefined set of possible $K_D$ values. In other embodiments, NR MIB 622 or an NR SIB 824 may comprise information specifying the values comprised in value set 818. In some embodiments, rather than enumerating each individual value comprised in value set 818, NR MIB 622 or an NR SIB 824 may simply indicate a largest value comprised in value set 818. In such embodiments, UE 604 may apply predefined rules to identify the other values comprised in value set 818 as a function of that largest value. In various embodiments, value set 818 may comprise one of multiple defined sets of possible $K_D$ values, where each of the multiple defined sets corresponds, respectively, to one or more defined PRACH resource sets. In such embodiments, UE 604 may be configured with knowledge of the correspondences between PRACH resource sets and their respective value sets via information comprised in NR MIB 622 or an NR SIB 824, and may identify value set 818 based on the identity of PRACH resource set 829. The embodiments are not limited in this context.

FIG. 9 illustrates an example of an operating environment 900 that may be representative of the implementation of one or more of the disclosed timing determination techniques according to various embodiments. In operating environment 900, in response to receipt of random access response 730, UE 604 may send RRC message 732 to gNB 602. In various embodiments, as of the time at which it receives random access response 730, UE 604 may have acquired the NR MIB 622 for NG-RAN cell 603 (not pictured in FIG. 9) and one or more NR SIBs 924 for NG-RAN cell 603. In various embodiments, NR SIB(s) 924 may constitute the same NR SIB(s) as NR SIB(s) 824 of FIG. 8. In various other embodiments, NR SIB(s) 924 may include one or more additional NR SIBs acquired after transmission of random access preamble 728 (not pictured in FIG. 9). In various embodiments, RRC message 732 may comprise an RRC Connection Request message. For example, RRC message 732 may comprise an RRC Connection Request message in various embodiments in which UE 604 initiates the random access procedure in conjunction with an initial access process. In various other embodiments, RRC message 732 may comprise an RRC Connection Reconfiguration Complete message. For example, RRC message 732 may comprise an RRC Connection Reconfiguration Complete message in various embodiments in which UE 604 initiates the random access procedure in conjunction with an RRC reconfiguration process.

In various embodiments, UE 604 may receive DL data 808 during slot $S_{808}$ and extract random access response 730 from DL data 708. In various embodiments, UE 604 may set the value of its UL timing advance based on information, such as a timing advance command, comprised in random access response 730. In various embodiments, random access response 730 may comprise UL grant information 912. In various embodiments, UL grant information 912 may comprise information specifying UL channel resources that are granted to UE 604 for use in conjunction with UL data transmission during a slot $S_{914}$, which may or may not be a different slot than slot $S_{808}$. In various embodiments, using the UL channel resources specified by UL grant information 912, UE 604 may transmit UL data 914 comprising RRC message 732 during slot $S_{914}$. In various embodiments, UE 604 may identify an offset value 926 that constitutes an applicable value of $K_U$ with respect to the transmission of UL data 914, and may identify slot $S_{914}$ based on the identity of slot $S_{808}$ and on the identified offset value 926.

In various embodiments, offset value 926 may correspond to a value indicated in NR MIB 622, or a value indicated in an NR SIB 924. In some embodiments in which PRACH resource sets are defined, such a value may be specific to one or more PRACH resource sets, such that UE 604 identifies offset value 926 based on the identity of the PRACH resource set 829 comprising the randomly-selected PRACH resource used for transmission of random access preamble 728. In other embodiments in which PRACH resource sets are defined, such a value may apply to all PRACH resource sets, such that UE 604 identifies offset value 926 without reference to the identity of PRACH resource set 829. In various embodiments, UE 604 may be configured to regard a particular fixed value as constituting the applicable $K_U$ value with respect to transmission of UL data comprising an initial transmission of RRC message 732 during a random access procedure, and offset value 926 may correspond to that fixed value. The embodiments are not limited in this context.

FIG. 9 additionally illustrates an example of an operating environment 900A. In operating environment 900A, UE 604 may identify a value set 918 comprising two or more possible $K_U$ values, and may identify one such value as constituting offset value 926 based on an indicator 920 comprised in random access response 730. In various embodiments, value set 918 may comprise a predefined set of possible $K_U$ values. In other embodiments, NR MIB 622 or an NR SIB 924 may comprise information specifying the values comprised in value set 918. In some embodiments, rather than enumerating each individual value comprised in value set 918, NR MIB 622 or an NR SIB 924 may simply indicate a largest value comprised in value set 918. In such embodiments, UE 604 may apply predefined rules to identify the other values comprised in value set 918 as a function of that largest value. In a non-limiting example, an NR SIB 924 may comprise information indicating that the largest value comprised in value set 918 is 8, and based on that information and on predefined rules, UE 604 may determine that value set 918 consists of the values 1, 2, 4, and 8. In some embodiments in which PRACH resource sets are defined, value set 918 may be specific to one or more particular PRACH resource sets, such that UE 604 identifies value set 918 based on the identity of the PRACH resource set 829 comprising the randomly-selected PRACH resource used for transmission of random access preamble 728. In other embodiments in which PRACH resource sets are defined, value set 918 may apply to all PRACH resource sets, such that UE 604 identifies value set 918 without reference to the identity of PRACH resource set 829. The embodiments are not limited in this context.

FIG. 9 further illustrates an example of an operating environment 900B. In operating environment 900B, UE 604 may identify offset value 926 based on a value 931 comprised in random access response 730. In various embodiments, value 931 may itself constitute the applicable $K_U$ value with respect to transmission of UL data 914, such that offset value 926 is equal to value 931. In various other embodiments, value 931 may be representative of a delay value that is to be added to a base value in order to calculate offset value 926. For example, in various embodiments, UE 604 may be configured to determine offset value 926 by adding value 931 to a predefined base value. In another example, in various embodiments, UE 604 may be configured to determine offset value 926 by adding value 931 to a base value indicated in NR MIB 622 or in an NR SIB 924. In various embodiments in which PRACH resource sets are defined, such a base value may be specific to one or more particular PRACH resource sets, such that UE 604 identifies that base value based on the identity of the PRACH resource set 829 comprising the randomly-selected PRACH resource used for transmission of random access preamble 728. In other embodiments in which PRACH resource sets are defined, such a base value may apply to all PRACH resource sets, such that UE 604 identifies that base value without reference to the identity of PRACH resource set 829. The embodiments are not limited in this context.

It is worthy of note that in various embodiments, rather than representing possible values of $K_U$, the values in value set 918 in operating environment 900A may represent possible delay values. In some such embodiments, based on indicator 920, UE 604 may identify a particular value in value set 918 as a delay value that is to be added to a base value in order to calculate offset value 926. As in operating environment 900B, such a base value may be predefined, or may be indicated in NR MIB 622 or in an NR SIB 924. Likewise, if PRACH resource sets are defined, such a base value may be specific to one or more particular PRACH resource sets, or may apply to all PRACH resource sets. The embodiments are not limited in this context.

FIG. 10 illustrates an example of an operating environment 1000 that may be representative of the implementation of one or more of the disclosed timing determination techniques according to various embodiments. In operating environment 1000, having failed to successfully receive UL data 914 of FIG. 9 and extract RRC message 732 from therein, gNB 602 may prompt UE 604 to resend RRC message 732. In various embodiments, in order to prompt UE 604 to resend RRC message 732, gNB 602 may transmit a UL scheduling grant 1012 to UE 604. In various embodiments, as of the time at which it receives UL scheduling grant 1012, UE 604 may have acquired the NR MIB 622 for NG-RAN cell 603 (not pictured in FIG. 10) and one or more NR SIBs 1024 for NG-RAN cell 603. In various embodiments, NR SIB(s) 1024 may constitute the same NR SIB(s) as NR SIB(s) 824 of FIG. 8. In various other embodiments, NR SIB(s) 1024 may include one or more additional NR SIBs acquired after transmission of random access preamble 728 (not pictured in FIG. 10). In various embodiments, gNB 602 may transmit UL scheduling grant 1012 during a slot $S_{1012}$ in order to grant UL channel resources to UE 604 for use in conjunction with UL data transmission during a slot $S_{1014}$, which may or may not be the same as slot $S_{1012}$. In various embodiments, using the UL channel resources granted via UL scheduling grant 1012, UE 604 may transmit UL data 1014 comprising RRC message 732 during slot $S_{1014}$. In various embodiments, UE 604 may identify an offset value 1026 that constitutes an applicable value of $K_U$ with respect to the transmission of UL data 1014, and may identify slot $S_{1014}$ based on the identity of slot $S_{1012}$ and on the identified offset value 1026.

In various embodiments, offset value 1026 may correspond to a value indicated in NR MIB 622 or a value indicated in an NR SIB 1024. In some embodiments in which PRACH resource sets are defined, such a value may be specific to one or more PRACH resource sets, such that UE 604 identifies offset value 1026 based on the identity of the PRACH resource set 829 comprising the randomly-selected PRACH resource used for transmission of random access preamble 728. In other embodiments in which PRACH resource sets are defined, such a value may apply to all PRACH resource sets, such that UE 604 identifies offset value 1026 without reference to the identity of PRACH resource set 829. In various embodiments, UE 604 may be configured to regard a particular fixed value as constituting the applicable $K_U$ value with respect to transmission of UL data comprising a retransmission of RRC message 732 during a random access procedure, and offset value 1026 may correspond to that fixed value. In some embodiments, for example, UE 604 may be configured to regard the applicable $K_U$ value to be fixed at 4 with respect to transmission of UL data comprising a retransmission of RRC message 732 during a random access procedure, and offset value 1026 may thus be equal to 4. In various embodiments, in conjunction with network configuration, such a fixed value may be chosen based on a designated maximum allowable number of HARQ processes. For instance, in some embodiments, such a fixed value may be equal to half the designated maximum allowable number of HARQ processes. In an example embodiment, the designated maximum allowable number of HARQ processes may be equal to 8, and UE 604 may be configured to regard the applicable $K_U$ value to be fixed at 4 with respect to transmission of UL data comprising a retransmission of RRC message 732 during a random access procedure. The embodiments are not limited to this example.

In various embodiments, offset value 1026 may correspond to a value—such as may be predefined, or may be indicated in NR MIB 622 or an NR SIB 1024—that is specific to the context of retransmission of RRC message 732. In various other embodiments, offset value 1026 may correspond to a value that applies both in the context of initial transmission of RRC message 732 and in the context of retransmission of RRC message 732. In various such embodiments, offset value 926 of FIG. 9 may correspond to that same value, and thus offset value 1026 may be the same as offset value 926. The embodiments are not limited in this context.

FIG. 10 additionally illustrates an example of an operating environment 1000A. In operating environment 1000A, UE 604 may identify a value set 1018 comprising two or more possible $K_U$ values, and may identify one such value as constituting offset value 1026 based on an indicator 1020 comprised in UL scheduling grant 1012. In some embodiments, rather than being comprised in UL scheduling grant 1012, indicator 1020 may be comprised in random access response 730.

In various embodiments, value set 1018 may comprise a predefined set of possible $K_U$ values. In other embodiments, NR MIB 622 or an NR SIB 1024 may comprise information specifying the values comprised in value set 1018. In some embodiments, rather than enumerating each individual value comprised in value set 1018, NR MIB 622 or an NR SIB 1024 may simply indicate a largest value comprised in value set 1018. In such embodiments, UE 604 may apply predefined rules to identify the other values comprised in value set 1018 as a function of that largest value. In an example, an NR SIB 1024 may comprise information indicating that the largest value comprised in value set 1018 is 8, and based on that information and on predefined rules, UE 604 may determine that value set 1018 consists of the values 1, 2, 4, and 8. The embodiments are not limited to this example.

In various embodiments, value set 1018 may represent a value set that is specific to the context of retransmission of RRC message 732, while value set 918 of FIG. 9 may represent another value set that is specific to the context of initial transmission of RRC message 732. In various other embodiments, value sets 918 and 1018 may both represent a same value set that is used both in conjunction with initial transmissions of RRC message 732 and in conjunction with retransmissions of RRC message 732. In some embodiments in which PRACH resource sets are defined, value set 1018 may be specific to one or more particular PRACH resource sets, such that UE 604 identifies value set 1018 based on the identity of the PRACH resource set 829 comprising the randomly-selected PRACH resource used for transmission of random access preamble 728. In other embodiments in which PRACH resource sets are defined, value set 1018 may apply to all PRACH resource sets, such that UE 604 identifies value set 1018 without reference to the identity of PRACH resource set 829. The embodiments are not limited in this context.

FIG. 10 further illustrates an example of an operating environment 1000B. In operating environment 1000B, UE 604 may identify offset value 1026 based on a value 1031 comprised in UL scheduling grant 1012. In various embodiments, value 1031 may itself constitute the applicable $K_U$ value with respect to transmission of UL data 1014, such that offset value 1026 is equal to value 1031. In various other embodiments, value 1031 may be representative of a delay value that is to be added to a base value in order to calculate offset value 1026. For example, in various embodiments, UE 604 may be configured to determine offset value 1026 by adding value 1031 to a predefined base value. In another example, in various embodiments, UE 604 may be configured to determine offset value 1026 by adding value 1031 to a base value indicated in NR MIB 622 or in an NR SIB 1024. In various embodiments in which PRACH resource sets are defined, such a base value may be specific to one or more particular PRACH resource sets, such that UE 604 identifies that base value based on the identity of the PRACH resource set 829 comprising the randomly-selected PRACH resource used for transmission of random access preamble 728. In other embodiments in which PRACH resource sets are defined, such a base value may apply to all PRACH resource sets, such that UE 604 identifies that base value without reference to the identity of PRACH resource set 829. The embodiments are not limited in this context.

It is worthy of note that in various embodiments, rather than representing possible values of $K_U$, the values in value set 1018 in operating environment 1000A may represent possible delay values. In some such embodiments, based on indicator 1020, UE 604 may identify a particular value in value set 1018 as a delay value that is to be added to a base value in order to calculate offset value 1026. As in operating environment 1000B, such a base value may be predefined, or may be indicated in NR MIB 622 or in an NR SIB 1024. Likewise, if PRACH resource sets are defined, such a base value may be specific to one or more particular PRACH resource sets, or instead may apply to all PRACH resource sets. According to various embodiments, offset value 1026 may be determined in operating environment 1000A or 1000B using a base value—such as may be predefined, or may be indicated in NR MIB 622 or an NR SIB 1024—that is specific to the context of retransmission of RRC message 732. According to various other embodiments, offset value 1026 may be determined in operating environment 1000A or 1000B using a base value that applies both in the context of initial transmission of RRC message 732 and in the context of retransmission of RRC message 732. In various such embodiments, a base value used to determine offset value 926 in operating environment 900A or 900B of FIG. 9 may also be used to determine offset value 1026 in operating environment 1000A or 1000B. The embodiments are not limited in this context.

In various embodiments, UE 604 may be configured to determine offset value 1026 as a function of the offset value 926 that characterizes the timing of transmission of UL data 914 of FIG. 9. In various embodiments, for instance, UE 604 may be configured to determine offset value 1026 by applying a relative timing offset to offset value 926. In a non-limiting example, offset value 926 may indicate a $K_U$ value of 6 slots with respect to transmission of UL data 914, and based on an applicable relative timing offset of −2 slots, UE 604 may calculate offset value 1026 as being equal to 4 (indicating an $K_U$ value of 4 slots with respect to transmission of UL data 1014). In various embodiments, the value of such a relative timing offset may be predefined. In various other embodiments, NR MIB 622 or an NR SIB 1024 may comprise information indicating the value of such a relative timing offset. The embodiments are not limited in this context.

FIG. 11 illustrates an example of an operating environment 1100 that may be representative of the implementation of one or more of the disclosed timing determination techniques according to various embodiments. In operating environment 1100, in response to receipt of RRC message 732 (not pictured in FIG. 11), gNB 602 may send contention resolution message 734 to UE 604. In various embodiments, contention resolution message 734 may comprise a medium access control (MAC) control element (CE). In various embodiments, for example, contention resolution message 734 may comprise a UE Contention Resolution Identity MAC CE. In various embodiments, in order to schedule transmission of DL data comprising contention resolution message 734, gNB 602 may transmit a DL scheduling command 1106 to UE 604. In various embodiments, as of the time at which it receives DL scheduling command 1106, UE 604 may have acquired the NR MIB 622 for NG-RAN cell 603 (not pictured in FIG. 11) and one or more NR SIBs 1124 for NG-RAN cell 603. In various embodiments, NR SIB(s) 1124 may constitute the same NR SIB(s) as NR SIB(s) 824 of FIG. 8. In various other embodiments, NR SIB(s) 1124 may include one or more additional NR SIBs acquired after transmission of random access preamble 728 (not pictured in FIG. 11). In various embodiments, gNB 602 may transmit DL scheduling command 1106 during a slot $S_{1106}$ in order to schedule transmission, during a slot $S_{1108}$, of DL data 1108 comprising contention resolution message 734, where slot $S_{1108}$ may or may not be a different slot than slot $S_{1106}$. In various embodiments, UE 604 may identify an offset value 1126 that constitutes an applicable value of $K_D$ with respect to the transmission of DL data 1108, and may identify slot $S_{1108}$ based on the identity of slot $S_{1106}$ and on the identified offset value 1126.

In various embodiments, offset value 1126 may correspond to a value indicated in NR MIB 622 or a value indicated in an NR SIB 1124. In various embodiments in which PRACH resource sets are defined, such a value may be specific to one or more PRACH resource sets, such that UE 604 identifies offset value 1126 based on the identity of the PRACH resource set 829 comprising the randomly-selected PRACH resource used for transmission of random access preamble 728. In other embodiments in which PRACH resource sets are defined, such a value may apply to all PRACH resource sets, such that UE 604 identifies offset value 1126 without reference to the identity of PRACH resource set 829. In various embodiments, UE 604 may be configured to regard a particular fixed value as constituting the applicable $K_D$ value with respect to transmission of DL data comprising an initial transmission of contention resolution message 734 during a random access procedure, and offset value 1126 may correspond to that fixed value. In various embodiments, for example, UE 604 may be configured to regard the applicable $K_D$ value to be fixed at 0 with respect to transmission of DL data comprising an initial transmission of contention resolution message 734, and offset value 1126 may thus be equal to 0. The embodiments are not limited to this example.

FIG. 11 additionally illustrates an example of an operating environment 1100A. In operating environment 1100A, UE 604 may identify a value set 1118 comprising two or more possible $K_D$ values, and may identify one such value as constituting offset value 1126 based on an indicator 1120 comprised in DL scheduling command 1106. In various embodiments, value set 1118 may comprise a predefined set of possible $K_D$ values. In other embodiments, NR MIB 622 or an NR SIB 1124 may comprise information specifying the values comprised in value set 1118. In some embodiments, rather than enumerating each individual value comprised in value set 1118, NR MIB 622 or an NR SIB 1124 may simply indicate a largest value comprised in value set 1118. In such embodiments, UE 604 may apply predefined rules to identify the other values comprised in value set 1118 as a function of that largest value. In some embodiments in which PRACH resource sets are defined, value set 1118 may be specific to one or more particular PRACH resource sets, such that UE 604 identifies value set 1118 based on the identity of the PRACH resource set 829 comprising the randomly-selected PRACH resource used for transmission of random access preamble 728. In other embodiments in which PRACH resource sets are defined, value set 1118 may apply to all PRACH resource sets, such that UE 604 identifies value set 1118 without reference to the identity of PRACH resource set 829. The embodiments are not limited in this context.

FIG. 11 further illustrates an example of an operating environment 1100B. In operating environment 1100B, UE 604 may identify offset value 1126 based on a value 1131 comprised in DL scheduling command 1106. In various embodiments, value 1131 may itself constitute the applicable $K_D$ value with respect to transmission of DL data 1108, such that offset value 1126 is equal to value 1131. In various other embodiments, value 1131 may be representative of a delay value that is to be added to a base value in order to calculate offset value 1126. For example, in various embodiments, UE 604 may be configured to determine offset value 1126 by adding value 1131 to a predefined base value. In another example, in various embodiments, UE 604 may be configured to determine offset value 1126 by adding value 1131 to a base value indicated in NR MIB 622 or in an NR SIB 1124. In various embodiments in which PRACH resource sets are defined, such a base value may be specific to one or more particular PRACH resource sets, such that UE 604 identifies that base value based on the identity of the PRACH resource set 829 comprising the randomly-selected PRACH resource used for transmission of random access preamble 728. In other embodiments in which PRACH resource sets are defined, such a base value may apply to all PRACH resource sets, such that UE 604 identifies that base value without reference to the identity of PRACH resource set 829. The embodiments are not limited in this context.

It is worthy of note that in various embodiments, rather than representing possible values of Kr), the values in value set 1118 in operating environment 1100A may represent possible delay values. In some such embodiments, based on indicator 1120, UE 604 may identify a particular value in value set 1118 as a delay value that is to be added to a base value in order to calculate offset value 1126. As in operating environment 1100B, such a base value may be predefined, or may be indicated in NR MIB 622 or in an NR SIB 1124. Likewise, if PRACH resource sets are defined, such a base value may be specific to one or more particular PRACH resource sets, or instead may apply to all PRACH resource sets. The embodiments are not limited in this context.

FIG. 12 illustrates an example of an operating environment 1200 that may be representative of the implementation of one or more of the disclosed timing determination techniques according to various embodiments. In operating environment 1200, based on a determination that a positive acknowledgment of receipt of contention resolution message 734 has not been received from UE 604, gNB 602 may resend contention resolution message 734. In various embodiments, in order to schedule a DL data transmission comprising a retransmission of contention resolution message 734, gNB 602 may transmit a DL scheduling command 1206 to UE 604. In various embodiments, as of the time at which it receives DL scheduling command 1206, UE 604 may have acquired the NR MIB 622 for NG-RAN cell 603 (not pictured in FIG. 12) and one or more NR SIBs 1224 for NG-RAN cell 603. In various embodiments, NR SIB(s) 1224 may constitute the same NR SIB(s) as NR SIB(s) 824 of FIG. 8. In various other embodiments, NR SIB(s) 1224 may include one or more additional NR SIBs acquired after transmission of random access preamble 728 (not pictured in FIG. 12). In various embodiments, gNB 602 may transmit DL scheduling command 1206 during a slot $S_{1206}$ in order to schedule transmission, during a slot $S_{1208}$, of DL data 1208 comprising contention resolution message 734, where slot $S_{1208}$ may or may not be a different slot than slot $S_{1206}$. In various embodiments, UE 604 may identify an offset value 1226 that constitutes an applicable value of $K_D$ with respect to the transmission of DL data 1208, and may identify slot $S_{1208}$ based on the identity of slot $S_{1206}$ and on the identified offset value 1226.

In various embodiments, offset value 1226 may correspond to a value indicated in NR MIB 622 or a value indicated in an NR SIB 1224. In various embodiments in which PRACH resource sets are defined, such a value may be specific to one or more PRACH resource sets, such that UE 604 identifies offset value 1226 based on the identity of the PRACH resource set 829 comprising the randomly-selected PRACH resource used for transmission of random access preamble 728. In other embodiments in which PRACH resource sets are defined, such a value may apply to all PRACH resource sets, such that UE 604 identifies offset value 1226 without reference to the identity of PRACH resource set 829. In various embodiments, UE 604 may be configured to regard a particular fixed value as constituting the applicable $K_D$ value with respect to transmission of DL data comprising a retransmission of contention resolution message 734 during a random access procedure, and offset value 1226 may correspond to that fixed value. In various embodiments, for example, UE 604 may be configured to regard the applicable $K_D$ value to be fixed at 0 with respect to transmission of DL data comprising a retransmission of contention resolution message 734, and offset value 1226 may thus be equal to 0. The embodiments are not limited to this example.

In various embodiments, offset value 1226 may correspond to a value—such as may be predefined, or may be indicated in NR MIB 622 or an NR SIB 1224—that is specific to the context of retransmission of contention resolution message 734. In various other embodiments, offset value 1226 may correspond to a value that applies both in the context of initial transmission of contention resolution message 734 and in the context of retransmission of contention resolution message 734. In various such embodiments, offset value 1126 of FIG. 11 may correspond to that same value, and thus offset value 1226 may be the same as offset value 1126. The embodiments are not limited in this context.

FIG. 12 additionally illustrates an example of an operating environment 1200A. In operating environment 1200A, UE 604 may identify a value set 1218 comprising two or more possible $K_D$ values, and may identify one such value as constituting offset value 1226 based on an indicator 1220 comprised in DL scheduling command 1206. In various embodiments, value set 1218 may comprise a predefined set of possible $K_D$ values. In other embodiments, NR MIB 622 or an NR SIB 1224 may comprise information specifying the values comprised in value set 1218. In some embodiments, rather than enumerating each individual value comprised in value set 1218, NR MIB 622 or an NR SIB 1224 may simply indicate a largest value comprised in value set 1218. In such embodiments, UE 604 may apply predefined rules to identify the other values comprised in value set 1218 as a function of that largest value. The embodiments are not limited in this context.

In various embodiments, value set 1218 may represent a value set that is specific to the context of retransmission of contention resolution message 734, while value set 1118 of FIG. 11 may represent another value set that is specific to the context of initial transmission of contention resolution message 734. In various other embodiments, value sets 1118 and 1218 may both represent a same value set that is used both in conjunction with initial transmissions of contention resolution message 734 and in conjunction with retransmissions of contention resolution message 734. In some embodiments in which PRACH resource sets are defined, value set 1218 may be specific to one or more particular PRACH resource sets, such that UE 604 identifies value set 1218 based on the identity of the PRACH resource set 829 comprising the randomly-selected PRACH resource used for transmission of random access preamble 728. In other embodiments in which PRACH resource sets are defined, value set 1218 may apply to all PRACH resource sets, such that UE 604 identifies value set 1218 without reference to the identity of PRACH resource set 829. The embodiments are not limited in this context.

FIG. 12 further illustrates an example of an operating environment 1200B. In operating environment 1200B, UE 604 may identify offset value 1226 based on a value 1231 comprised in DL scheduling command 1206. In various embodiments, value 1231 may itself constitute the applicable $K_D$ value with respect to transmission of DL data 1208, such that offset value 1226 is equal to value 1231. In various other embodiments, value 1231 may be representative of a delay value that is to be added to a base value in order to calculate offset value 1226. For example, in various embodiments, UE 604 may be configured to determine offset value 1226 by adding value 1231 to a predefined base value. In another example, in various embodiments, UE 604 may be configured to determine offset value 1226 by adding value 1231 to a base value indicated in NR MIB 622 or in an NR SIB 1224. In various embodiments in which PRACH resource sets are defined, such a base value may be specific to one or more particular PRACH resource sets, such that UE 604 identifies that base value based on the identity of the PRACH resource set 829 comprising the randomly-selected PRACH resource used for transmission of random access preamble 728. In other embodiments in which PRACH resource sets are defined, such a base value may apply to all PRACH resource sets, such that UE 604 identifies that base value without reference to the identity of PRACH resource set 829. The embodiments are not limited in this context.

It is worthy of note that in various embodiments, rather than representing possible values of $K_D$, the values in value set 1218 in operating environment 1200A may represent possible delay values. In some such embodiments, based on indicator 1220, UE 604 may identify a particular value in value set 1218 as a delay value that is to be added to a base value in order to calculate offset value 1226. As in operating environment 1200B, such a base value may be predefined, or may be indicated in NR MIB 622 or in an NR SIB 1224. Likewise, if PRACH resource sets are defined, such a base value may be specific to one or more particular PRACH resource sets, or instead may apply to all PRACH resource sets. According to various embodiments, offset value 1226 may be determined in operating environment 1200A or 1200B using a base value—such as may be predefined, or may be indicated in NR MIB 622 or an NR SIB 1224—that is specific to the context of retransmission of contention resolution message 734. According to various other embodiments, offset value 1226 may be determined in operating environment 1200A or 1200B using a base value that applies both in the context of initial transmission of contention resolution message 734 and in the context of retransmission of contention resolution message 734. In various such embodiments, a base value used to determine offset value 1126 in operating environment 1100A or 1100B of FIG. 11 may also be used to determine offset value 1226 in operating environment 1200A or 1200B. The embodiments are not limited in this context.

FIG. 13 illustrates an example of an operating environment 1300 that may be representative of the implementation of one or more of the disclosed timing determination techniques according to various embodiments. In operating environment 1300, gNB 602 may transmit a DL scheduling command 1306 in order to schedule transmission of DL data 1308 comprising contention resolution message 734. In various embodiments, as of the time at which it receives DL scheduling command 1306, UE 604 may have acquired the NR MIB 622 for NG-RAN cell 603 (not pictured in FIG. 13) and one or more NR SIBs 1324 for NG-RAN cell 603. In various embodiments, NR SIB(s) 1324 may constitute the same NR SIB(s) as NR SIB(s) 824 of FIG. 8. In various other embodiments, NR SIB(s) 1324 may include one or more additional NR SIBs acquired after transmission of random access preamble 728 (not pictured in FIG. 12). In various embodiments, gNB 602 may transmit DL scheduling command 1306 during a slot $S_{1306}$ in order to schedule DL data 1308 for transmission during a slot $S_{1108}$, which may or may not be a different slot than slot $S_{1306}$. According to various embodiments, DL data 1308 may be representative of DL data 1108 of FIG. 11, in which case the transmission of DL data 1308 may correspond to an initial transmission of contention resolution message 734, and slots $S_{1306}$ and $S_{1308}$ may correspond to slots $S_{1106}$ and $S_{1108}$, respectively. According to various other embodiments, DL data 1308 may be representative of DL data 1208 of FIG. 12, in which case the transmission of DL data 1308 may correspond to a retransmission of contention resolution message 734, and slots $S_{1306}$ and $S_{1308}$ may correspond to slots $S_{1206}$ and $S_{1208}$, respectively. The embodiments are not limited in this context.

In order to acknowledge receipt of the contention resolution message 734 comprised in DL data 1308—or to report non-receipt of that contention resolution message 734—UE 604 may transmit HARQ feedback 1310 to gNB 602 during a slot $S_{1310}$, which may or may not be a different slot than slot $S_{1305}$. In various embodiments, UE 604 may identify an offset value 1326 that constitutes an applicable value of $K_H$ with respect to the transmission of HARQ feedback 1310, and may identify slot $S_{1310}$ based on the identity of slot $S_{1308}$ and on the identified offset value 1326.

In various embodiments, offset value 1326 may correspond to a value indicated in NR MIB 622 or a value indicated in an NR SIB 1324. In various embodiments in which PRACH resource sets are defined, such a value may be specific to one or more PRACH resource sets, such that UE 604 identifies offset value 1326 based on the identity of the PRACH resource set 829 comprising the randomly-selected PRACH resource used for transmission of random access preamble 728. In other embodiments in which PRACH resource sets are defined, such a value may apply to all PRACH resource sets, such that UE 604 identifies offset value 1326 without reference to the identity of PRACH resource set 829. In various embodiments, UE 604 may be configured to regard a particular fixed value as constituting the applicable $K_H$ value with respect to transmission of HARQ feedback for contention resolution message 734, and offset value 1326 may correspond to that fixed value. The embodiments are not limited in this context.

In various embodiments in which the transmission of DL data 1308 constitutes an initial transmission of contention resolution message 734, offset value 1326 may correspond to a value—such as may be predefined, or may be indicated in NR MIB 622 or an NR SIB 1324— that is specific to the context of HARQ feedback for an initial transmission of contention resolution message 734. In other embodiments in which the transmission of DL data 1308 constitutes an initial transmission of contention resolution message 734, offset value 1326 may correspond to a value that also applies in the context of HARQ feedback for a retransmission of contention resolution message 734. In various embodiments in which the transmission of DL data 1308 constitutes a retransmission of contention resolution message 734, offset value 1326 may correspond to a value—such as may be predefined, or may be indicated in NR MIB 622 or an NR SIB 1324—that is specific to the context of HARQ feedback for a retransmission of contention resolution message 734. In other embodiments in which the transmission of DL data 1308 constitutes a retransmission of contention resolution message 734, offset value 1326 may correspond to a value that also applies in the context of HARQ feedback for an initial transmission of contention resolution message 734. The embodiments are not limited in this context.

FIG. 13 additionally illustrates an example of an operating environment 1300A. In operating environment 1300A, UE 604 may identify a value set 1318 comprising two or more possible $K_H$ values, and may identify one such value as constituting offset value 1326 based on an indicator 1320 comprised in DL scheduling command 1306. In various embodiments, value set 1318 may comprise a predefined set of possible $K_H$ values. In other embodiments, NR MIB 622 or an NR SIB 1324 may comprise information specifying the values comprised in value set 1318. In some embodiments, rather than enumerating each individual value comprised in value set 1318, NR MIB 622 or an NR SIB 1324 may simply indicate a largest value comprised in value set 1318. In such embodiments, UE 604 may apply predefined rules to identify the other values comprised in value set 1318 as a function of that largest value. In some embodiments in which PRACH resource sets are defined, value set 1318 may be specific to one or more particular PRACH resource sets, such that UE 604 identifies value set 1318 based on the identity of the PRACH resource set 829 comprising the randomly-selected PRACH resource used for transmission of random access preamble 728. In other embodiments in which PRACH resource sets are defined, value set 1318 may apply to all PRACH resource sets, such that UE 604 identifies value set 1318 without reference to the identity of PRACH resource set 829. The embodiments are not limited in this context.

In various embodiments in which the transmission of DL data 1308 constitutes an initial transmission of contention resolution message 734, value set 1318 may represent a value set that is specific to the context of HARQ feedback for an initial transmission of contention resolution message 734. In other embodiments in which the transmission of DL data 1308 constitutes an initial transmission of contention resolution message 734, value set 1318 may represent a value set that also applies in the context of HARQ feedback for a retransmission of contention resolution message 734. In various embodiments in which the transmission of DL data 1308 constitutes a retransmission of contention resolution message 734, value set 1318 may represent a value set that is specific to the context of HARQ feedback for a retransmission of contention resolution message 734. In other embodiments in which the transmission of DL data 1308 constitutes a retransmission of contention resolution message 734, value set 1318 may represent a value set that also applies in the context of HARQ feedback for an initial transmission of contention resolution message 734. The embodiments are not limited in this context.

FIG. 13 further illustrates an example of an operating environment 1300B. In operating environment 1300B, UE 604 may identify offset value 1326 based on a value 1331 comprised in DL scheduling command 1306. In various embodiments, value 1331 may itself constitute the applicable $K_H$ value with respect to transmission of HARQ feedback 1310, such that offset value 1326 is equal to value 1331. In various other embodiments, value 1331 may be representative of a delay value that is to be added to a base value in order to calculate offset value 1326. For example, in various embodiments, UE 604 may be configured to determine offset value 1326 by adding value 1331 to a predefined base value. In another example, in various embodiments, UE 604 may be configured to determine offset value 1326 by adding value 1331 to a base value indicated in NR MIB 622 or in an NR SIB 1324. In various embodiments in which PRACH resource sets are defined, such a base value may be specific to one or more particular PRACH resource sets, such that UE 604 identifies that base value based on the identity of the PRACH resource set 829 comprising the randomly-selected PRACH resource used for transmission of random access preamble 728. In other embodiments in which PRACH resource sets are defined, such a base value may apply to all PRACH resource sets, such that UE 604 identifies that base value without reference to the identity of PRACH resource set 829. The embodiments are not limited in this context.

It is worthy of note that in various embodiments, rather than representing possible values of $K_H$, the values in value set 1318 in operating environment 1300A may represent possible delay values. In some such embodiments, based on indicator 1320, UE 604 may identify a particular value in value set 1318 as a delay value that is to be added to a base value in order to calculate offset value 1326. As in operating environment 1300B, such a base value may be predefined, or may be indicated in NR MIB 622 or in an NR SIB 1324. Likewise, if PRACH resource sets are defined, such a base value may be specific to one or more particular PRACH resource sets, or instead may apply to all PRACH resource sets. The embodiments are not limited in this context.

In various embodiments in which the transmission of DL data 1308 constitutes an initial transmission of contention resolution message 734, offset value 1326 may be determined in operating environment 1300A or 1300B using a base value that is specific to the context of HARQ feedback for an initial transmission of contention resolution message 734. In other embodiments in which the transmission of DL data 1308 constitutes an initial transmission of contention resolution message 734, offset value 1326 may be determined in operating environment 1300A or 1300B using a base value that also applies in the context of HARQ feedback for a retransmission of contention resolution message 734. In various embodiments in which the transmission of DL data 1308 constitutes a retransmission of contention resolution message 734, offset value 1326 may be determined in operating environment 1300A or 1300B using a base value that is specific to the context of HARQ feedback for a retransmission of contention resolution message 734. In other embodiments in which the transmission of DL data 1308 constitutes a retransmission of contention resolution message 734, offset value 1326 may be determined in operating environment 1300A or 1300B using a base value that also applies in the context of HARQ feedback for an initial transmission of contention resolution message 734. The embodiments are not limited in this context.

In the preceding discussion, with respect to each of FIGS. 8-13, it has been mentioned that in some embodiments, gNB 602 may define a plurality of PRACH resource sets, and that UE 604 may identify a value set associated with a particular PRACH resource set 829 comprising the PRACH resource used for transmission of random access preamble 728 and then identify a particular value within that value set as an applicable offset value. It is worthy of note that in some embodiments, an analogous relationship may be established between the value sets used for offset value determinations and the PDCCH resources used for DL scheduling command transmissions. In some embodiments, for example, gNB 602 may define one or more PDCCH resource sets, and UE 604 may be configured with knowledge of the defined PDCCH resource sets via information comprised in an NR MIB or NR SIB for NG-RAN cell 603. In some embodiments, based on the identity of a particular PDCCH resource set comprising the PDCCH resource(s) via which UE 604 receives DCI comprising a DL scheduling command, UE 604 may identify a particular value set to be used in conjunction with identifying a $K_D$ value applicable to the DL data transmission being scheduled. In some embodiments, based on the identity of a particular PDCCH resource set comprising the PDCCH resource(s) via which UE 604 receives DCI comprising a DL scheduling command, UE 604 may identify a particular value set to be used in conjunction with identifying a $K_H$ value applicable to transmission of HARQ feedback for a message comprised in the DL data transmission being scheduled. In some embodiments, based on the identity of a particular PDCCH resource set comprising the PDCCH resource(s) via which UE 604 receives DCI comprising a UL scheduling grant, UE 604 may identify a particular value set to be used in conjunction with identifying a $K_U$ value applicable to the UL data transmission being scheduled. The embodiments are not limited in this context.

Figure 14:
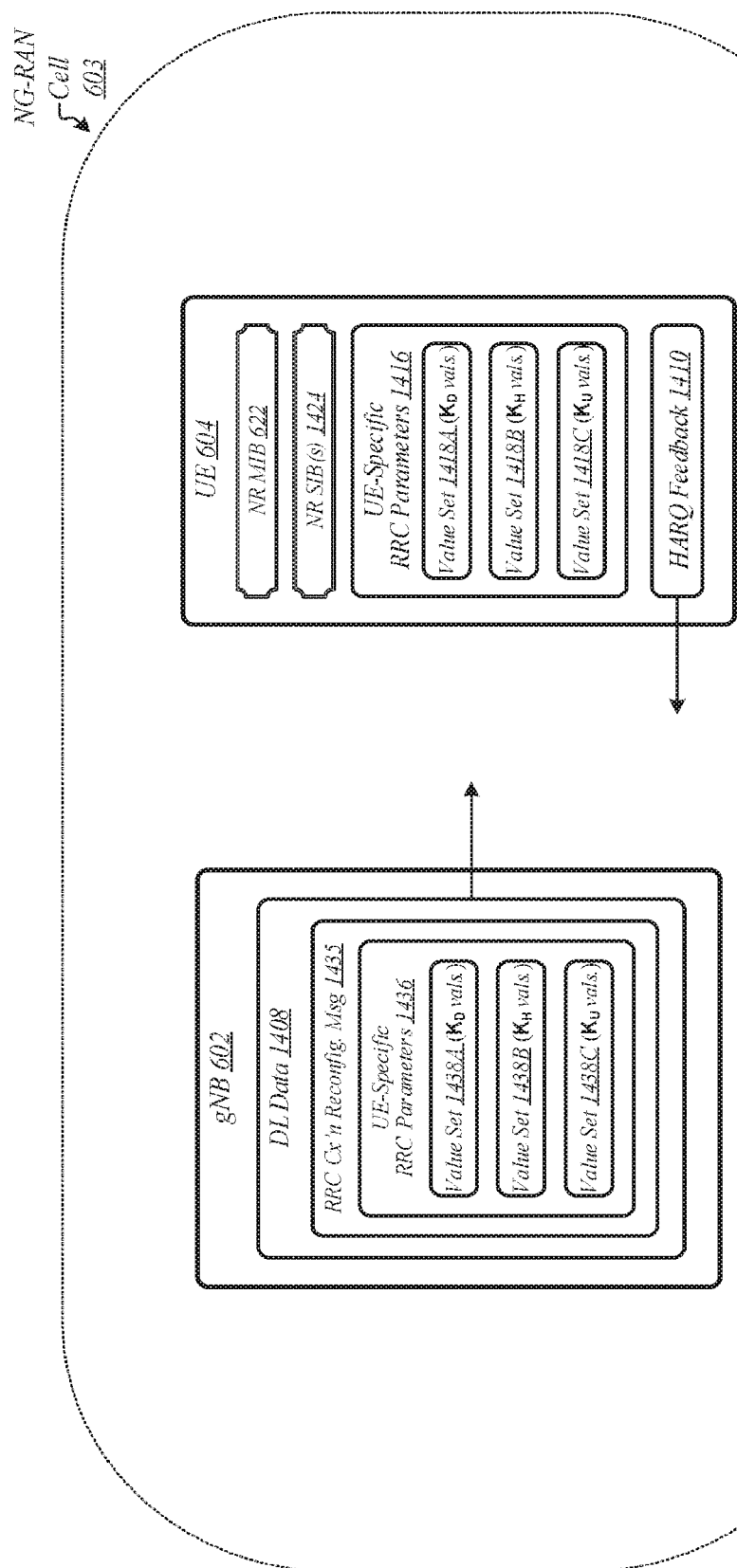
FIG. 14 illustrates an embodiment of a twenty-second operating environment.

FIG. 14 illustrates an example of an operating environment 1400 that may be representative of the implementation of one or more of the disclosed timing determination techniques according to various embodiments. In operating environment 1400, gNB 602 may initiate an RRC connection reconfiguration procedure in order to reconfigure an RRC connection of UE 604. In various embodiments, prior to the time of initiation of the RRC connection reconfiguration procedure, UE 604 may be configured with UE-specific RRC parameters 1416 that include a value set 1418A representing a UE-specific set of possible values of $K_D$, a value set 1418B representing a UE-specific set of possible values of $K_H$, and a value set 1418C representing a UE-specific set of possible values of $K_U$. In various embodiments, gNB 602 may initiate the RRC connection reconfiguration procedure by sending an RRC connection reconfiguration message 1435 to UE 604. In various embodiments, gNB 602 may transmit DL data 1408 comprising RRC connection reconfiguration message 1435 during a slot $S_{1408}$. In various embodiments, in order to acknowledge receipt of RRC connection reconfiguration message 1435, UE 604 may transmit HARQ feedback 1410 to gNB 602 during a slot $S_{1410}$, which may or may not be a different slot than slot $S_{1408}$. The embodiments are not limited in this context.

In various embodiments, RRC connection reconfiguration message 1435 may comprise UE-specific RRC parameters 1436 that include a value set 1438A representing a UE-specific set of possible values of $K_D$, a value set 1438B representing a UE-specific set of possible values of $K_H$, and a value set 1438C representing a UE-specific set of possible values of $K_U$. In various embodiments, according to the RRC connection reconfiguration procedure, UE 604 may be configured with the UE-specific RRC parameters 1436 comprised in RRC connection reconfiguration message 1435, and those UE-specific RRC parameters 1436 may generally replace the UE-specific RRC parameters 1416 with which UE 604 was previously configured. In various embodiments, in conjunction with the RRC connection reconfiguration procedure, the value sets 1438A, 1438B, and 1438C comprised among the UE-specific RRC parameters 1436 contained in RRC connection reconfiguration message 1435 may replace the respective value sets 1418A, 1418B, and 1418C comprised among UE-specific RRC parameters 1416. The embodiments are not limited in this context.

In various embodiments, UE 604 may be configured to wait until after the end of a designated timing gap before it begins using the value sets 1438A, 1438B, and 1438C contained in RRC connection reconfiguration message 1435. In various embodiments, the timing gap may generally be representative of a waiting period to be observed prior to initiating use of new UE-specific value sets received during RRC connection reconfiguration procedures. In various embodiments, UE 604 may use the value sets 1418A, 1418B, and 1418C comprised among UE-specific RRC parameters 1416 for determinations of $K_D$, $K_U$, and $K_U$ values during the timing gap. In various other embodiments, UE 604 may use value sets defined in an NR SIB 1424 for determinations of $K_D$, $K_U$, and $K_U$ values during the timing gap. The embodiments are not limited in this context.

In various embodiments, the duration of the timing gap may be specified as an integer number N of slots. In various embodiments, N may be predefined as a particular fixed value. In various other embodiments, the value of N may be specified by information comprised in NR MIB 622 or an NR SIB 1424. In yet other embodiments, the value of N may be configured via RRC signaling. In various embodiments, the timing gap may be defined to comprise the first N slots immediately following the slot during which the RRC connection reconfiguration message is sent.

In such embodiments, in the context of operating environment 1400, the timing gap may comprise the first N slots immediately following the slot $S_{1408}$ during which gNB 602 transmits the DL data 1408 comprising RRC connection reconfiguration message 1435. In various other embodiments, the timing gap may be defined to comprise the first N slots immediately following the slot during which HARQ feedback is transmitted in order to acknowledge receipt of the RRC connection reconfiguration message. In such embodiments, in the context of operating environment 1400, the timing gap may comprise the first N slots immediately following the slot $S_{1410}$ during which UE 604 transmits HARQ feedback 1410 in order to acknowledge receipt of RRC connection reconfiguration message 1435. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 15:
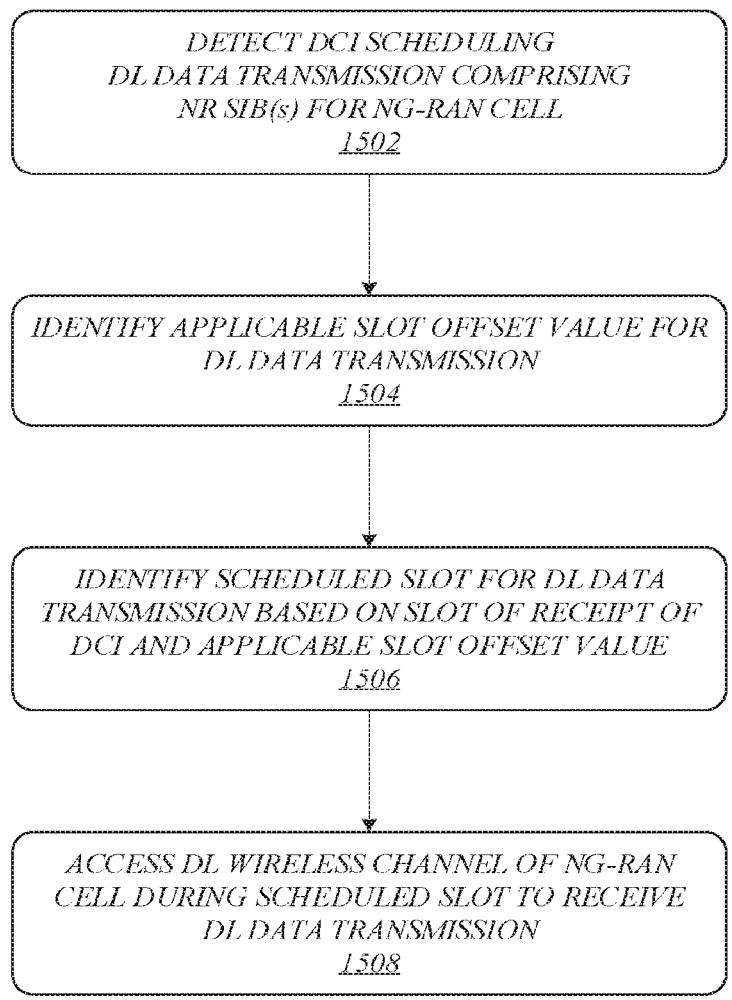
FIG. 15 illustrates an embodiment of a first logic flow.

FIG. 15 illustrates an example of a logic flow 1500 that may be representative of the implementation of one or more of the disclosed timing determination techniques according to various embodiments. For example, according to some embodiments, logic flow 1500 may be representative of operations that UE 604 may perform in conjunction with system information acquisition in operating environment 600 of FIG. 6. As shown in FIG. 15, DCI may be detected at 1502 that schedules a DL data transmission comprising one or more NR SIBs for an NG-RAN cell. For example, in operating environment 600, UE 604 may detect DL scheduling command 606, which may be received during slot $S_{606}$ and may comprise DCI that schedules transmission, during slot $S_{608}$, of DL data 608 comprising NR SIB 624.

At 1504, an applicable slot offset value for the DL data transmission may be identified. For example, in operating environment 600, UE 604 may identify offset value 626, which may constitute a slot offset value applicable to transmission of DL data 608. At 1506, a scheduled slot for the DL data transmission may be identified, based on a slot of receipt of the DCI and the applicable slot offset value. For example, in operating environment 600, UE 604 may identify slot $S_{608}$ based on the identity of slot $S_{606}$ and on the identified offset value 626. At 1508, a DL wireless channel of the NG-RAN cell may be accessed during the scheduled slot identified at 1506 in order to receive the DL data transmission. For example, in operating environment 600, UE 604 may access an NR PDSCH of NG-RAN cell 603 during slot $S_{608}$ in order to receive DL data 608. The embodiments are not limited to these examples.

Figure 16A:
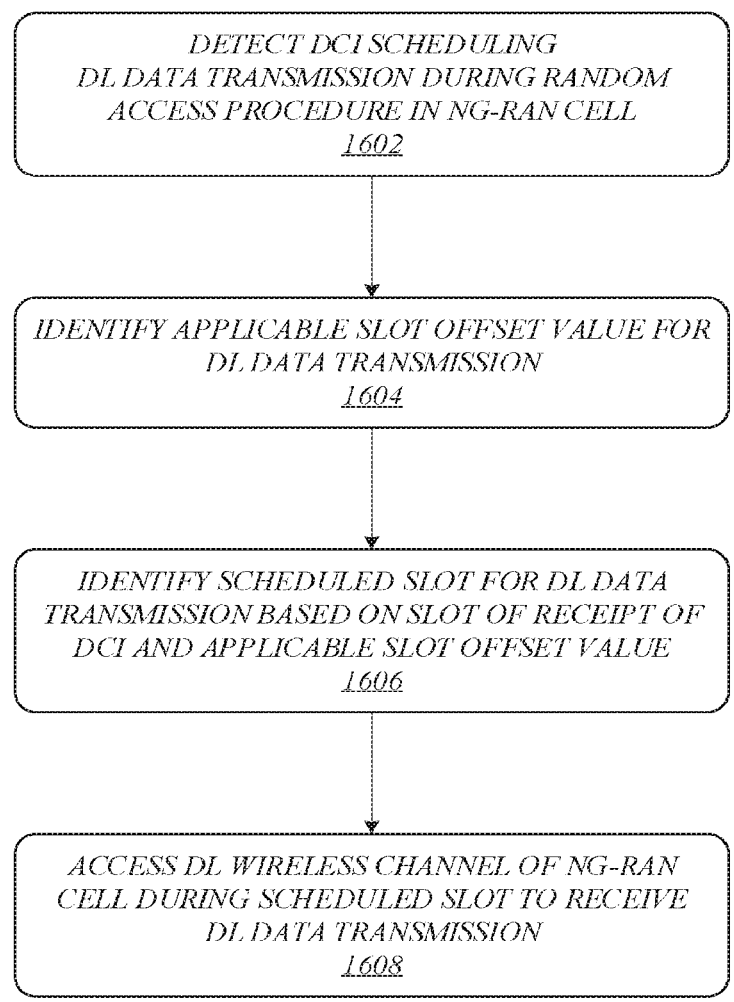
FIG. 16A illustrates an embodiment of a second logic flow.

FIG. 16A illustrates an example of a logic flow 1600 that may be representative of the implementation of one or more of the disclosed timing determination techniques according to various embodiments. For example, according to some embodiments, logic flow 1600 may be representative of operations that UE 604 may perform in conjunction with receiving random access response 730 in either of operating environments 800 and 800A of FIG. 8. According to various other example embodiments, logic flow 1600 may be representative of operations that UE 604 may perform in conjunction with receiving an initial transmission of contention resolution message 734 in any of operating environments 1100, 1100A, and 1100B of FIG. 11, and/or in conjunction with receiving a retransmission of contention resolution message 734 in any of operating environments 1200, 1200A, and 1200B of FIG. 12. The embodiments are not limited to these examples.

As shown in FIG. 16A, DCI may be detected at 1602 that schedules a DL data transmission during a random access procedure in an NG-RAN cell. In a first example, in either of operating environments 800 and 800A, UE 604 may detect DL scheduling command 806, which may be received during slot $S_{806}$ and may comprise DCI that schedules transmission, during slot $S_{808}$, of DL data 808 comprising random access response 730. In a second example, in any of operating environments 1100, 1100A, and 1100B, UE 604 may detect DL scheduling command 1106, which may be received during slot $S_{1106}$ and may comprise DCI that schedules transmission, during slot $S_{1108}$, of DL data 1108 comprising an initial transmission of contention resolution message 734. In a third example, in any of operating environments 1200, 1200A, and 1200B, UE 604 may detect DL scheduling command 1206, which may be received during slot $S_{1206}$ and may comprise DCI that schedules transmission, during slot $S_{1208}$, of DL data 1208 comprising a retransmission of contention resolution message 734. The embodiments are not limited to these examples.

At 1604, an applicable slot offset value for the DL data transmission may be identified. In a first example, in either of operating environments 800 and 800A, UE 604 may identify offset value 826, which may constitute a slot offset value applicable to transmission of DL data 808. In a second example, in any of operating environments 1100, 1100A, and 1100B, UE 604 may identify offset value 1126, which may constitute a slot offset value applicable to transmission of DL data 1108. In a third example, in any of operating environments 1200, 1200A, and 1200B, UE 604 may identify offset value 1226, which may constitute a slot offset value applicable to transmission of DL data 1208. The embodiments are not limited to these examples.

At 1606, a scheduled slot for the DL data transmission may be identified, based on a slot of receipt of the DCI and the applicable slot offset value. In a first example, in either of operating environments 800 and 800A, UE 604 may identify slot $S_{808}$ based on the identity of slot $S_{806}$ and on the identified offset value 826. In a second example, in any of operating environments 1100, 1100A, and 1100B, UE 604 may identify slot $S_{1108}$ based on the identity of slot $S_{1106}$ and on the identified offset value 1126. In a third example, in any of operating environments 1200, 1200A, and 1200B, UE 604 may identify slot $S_{1208}$ based on the identity of slot $S_{1206}$ and on the identified offset value 1226. The embodiments are not limited to these examples.

At 1608, a DL wireless channel of the NG-RAN cell may be accessed during the scheduled slot identified at 1606 in order to receive the DL data transmission. In a first example, in either of operating environments 800 and 800A, UE 604 may access an NR PDSCH of NG-RAN cell 603 during slot $S_{808}$ in order to receive DL data 808. In a second example, in any of operating environments 1100, 1100A, and 1100B, UE 604 may access an NR PDSCH of NG-RAN cell 603 during slot $S_{1108}$ in order to receive DL data 1108. In a third example, in any of operating environments 1200, 1200A, and 1200B, UE 604 may access an NR PDSCH of NG-RAN cell 603 during slot $S_{1208}$ in order to receive DL data 1208. The embodiments are not limited to these examples.

Figure 16B:
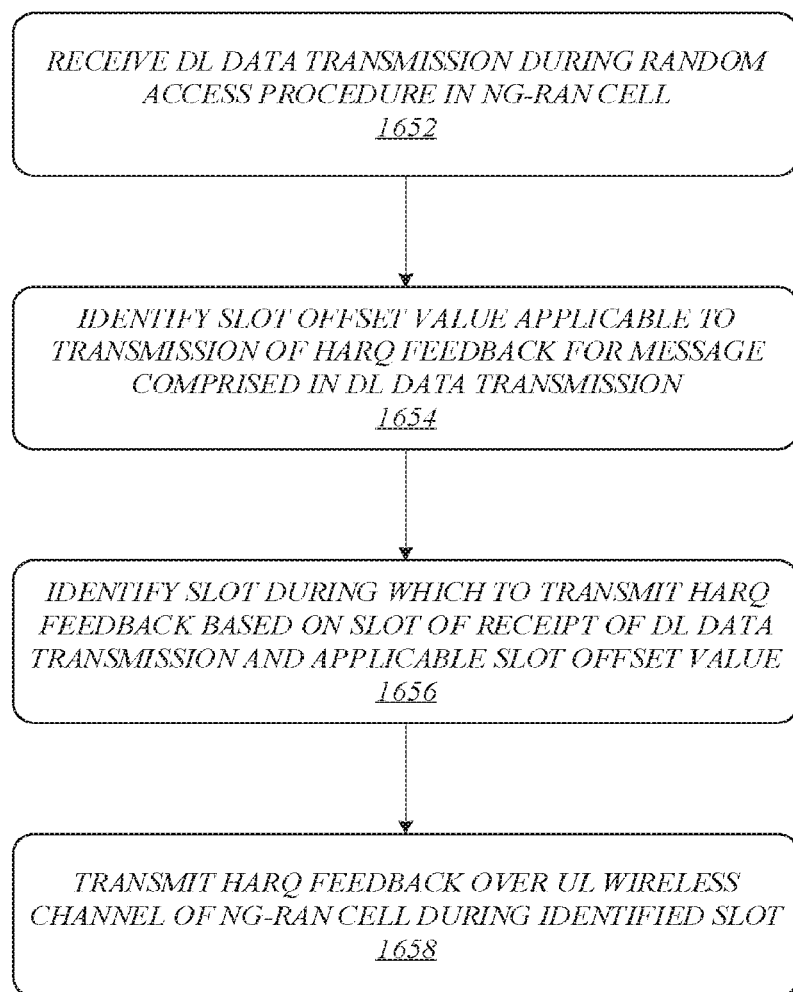
FIG. 16B illustrates an embodiment of a third logic flow.

FIG. 16B illustrates an example of a logic flow 1650 that may be representative of the implementation of one or more of the disclosed timing determination techniques according to various embodiments. For example, according to some embodiments, logic flow 1650 may be representative of operations that UE 604 may perform in any of operating environments 1300, 1300A, and 1300B of FIG. 13. As shown in FIG. 16B, at 1652, a DL data transmission may be received during a random access procedure in an NG-RAN cell. For example, in any of operating environments 1300, 1300A, and 1300B, UE 604 may receive DL data 1308 during slot $S_{1108}$. According to various embodiments, the DL data transmission received at 1652 may be received via a DL wireless channel accessed at 1608 in FIG. 16A, during a slot identified at 1606. Thus, for example, receipt of the DL data transmission at 1652 may involve receipt, via an NR PDSCH of RAN cell 603, of DL data 1108 during slot $S_{1108}$ in any of operating environments 1100, 1100A, and 1100B of FIG. 11, or of DL data 1208 during slot $S_{1208}$ in any of operating environments 1200, 1200A, and 1200B of FIG. 12. The embodiments are not limited to these examples.

At 1654, a slot offset value may be identified that is applicable to the transmission of HARQ feedback for a message comprised in the DL data transmission received at 1652. For example, in any of operating environments 1300, 1300A, and 1300B, UE 604 may identify offset value 1326, which may constitute a slot offset value applicable to transmission of HARQ feedback 1310 for a contention resolution message 734 comprised in DL data 1308. At 1656, a slot during which the HARQ feedback is to be transmitted may be identified based on a slot of receipt of the DL data transmission and the applicable slot offset value. For example, in any of operating environments 1300, 1300A, and 1300B, UE 604 may identify slot $S_{1310}$ based on the identity of slot $S_{1308}$ and on the identified offset value 1326. At 1658, the HARQ feedback may be transmitted over a UL wireless channel of the NG-RAN cell during the slot identified at 1656. For example, in any of operating environments 1300, 1300A, and 1300B, UE 604 may transmit HARQ feedback 1310 over an NR PUCCH of NG-RAN cell 603 during slot $S_{1310}$. The embodiments are not limited to these examples.

Figure 17:
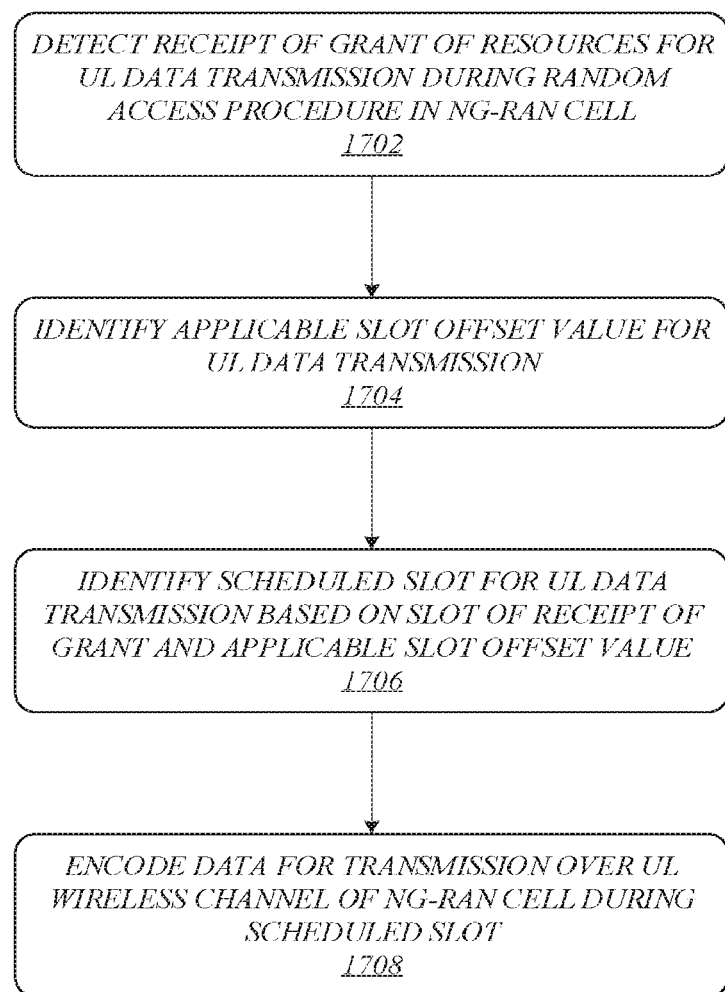
FIG. 17 illustrates an embodiment of a fourth logic flow.

FIG. 17 illustrates an example of a logic flow 1700 that may be representative of the implementation of one or more of the disclosed timing determination techniques according to various embodiments. For example, according to some embodiments, logic flow 1700 may be representative of operations that UE 604 may perform in conjunction with performing an initial transmission of RRC message 732 in any of operating environments 900, 900A, and 900B of FIG. 9. According to various other example embodiments, logic flow 1700 may be representative of operations that UE 604 may perform in conjunction with performing a retransmission of RRC message 732 in any of operating environments 1000, 1000A, and 1000B of FIG. 10. The embodiments are not limited to these examples.

As shown in FIG. 17, receipt may be detected at 1702 of a grant of resources for a UL data transmission during a random access procedure in an NG-RAN cell. In a first example, having received DL data 808 during slot $S_{808}$ in any of operating environments 900, 900A, and 900B, UE 604 may detect UL grant information 912 comprised in random access response 730, and UL grant information 912 may constitute a grant of resources for use to transmit, during slot $S_{914}$, UL data 914 comprising an initial transmission of RRC message 732. In a second example, in any of operating environments 1000, 1000A, and 1000B, UE 604 may detect UL scheduling grant 1012, which may be received during slot $S_{1012}$ and may constitute a grant of resources for use to transmit, during slot $S_{1014}$, UL data 1014 comprising a retransmission of RRC message 732. The embodiments are not limited to these examples.

At 1704, an applicable slot offset value for the UL data transmission may be identified. In a first example, in any of operating environments 900, 900A, and 900B, UE 604 may identify offset value 926, which may constitute a slot offset value applicable to transmission of UL data 914. In a second example, in any of operating environments 1000, 1000A, and 1000B, UE 604 may identify offset value 1026, which may constitute a slot offset value applicable to transmission of UL data 1014. The embodiments are not limited to these examples.

At 1706, a scheduled slot for the UL data transmission may be identified, based on a slot of receipt of the grant and the applicable slot offset value. In a first example, in any of operating environments 900, 900A, and 900B, UE 604 may identify slot $S_{914}$ based on the identity of slot $S_{808}$ and on the identified offset value 926. In a second example, in any of operating environments 1000, 1000A, and 1000B, UE 604 may identify slot $S_{1014}$ based on the identity of slot $S_{1012}$ and on the identified offset value 1026. The embodiments are not limited to these examples.

At 1708, data may be encoded for transmission over a UL wireless channel of the NG-RAN cell during the scheduled slot identified at 1706. In a first example, in any of operating environments 900, 900A, and 900B, UE 604 may encode UL data 914 for transmission over an NR PUSCH of NG-RAN cell 603 during slot $S_{914}$. In a second example, in any of operating environments 1000, 1000A, and 1000B, UE 604 may encode UL data 1014 for transmission over an NR PUSCH of NG-RAN cell 603 during slot $S_{1014}$. The embodiments are not limited to these examples.

Figure 18:
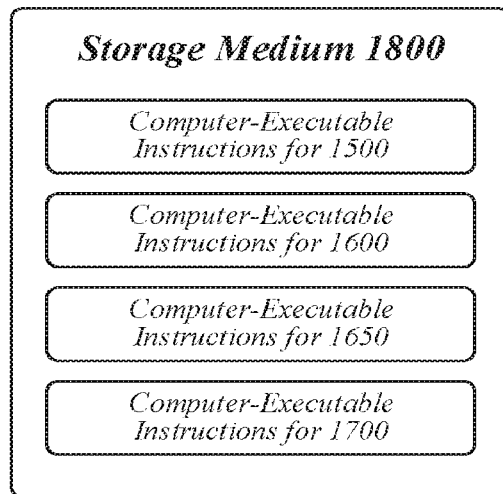
FIG. 18 illustrates an embodiment of a storage medium.

FIG. 18 illustrates an embodiment of a storage medium 1800. Storage medium 1800 may comprise any non-transitory computer-readable storage medium or machine-readable storage medium, such as an optical, magnetic or semiconductor storage medium. In various embodiments, storage medium 1800 may comprise an article of manufacture. In some embodiments, storage medium 1800 may store computer-executable instructions, such as computer-executable instructions to implement one or more of logic flow 1500 of FIG. 15, logic flow 1600 of FIG. 16A, logic flow 1650 of FIG. 16B, and logic flow 1700 of FIG. 17. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 19:
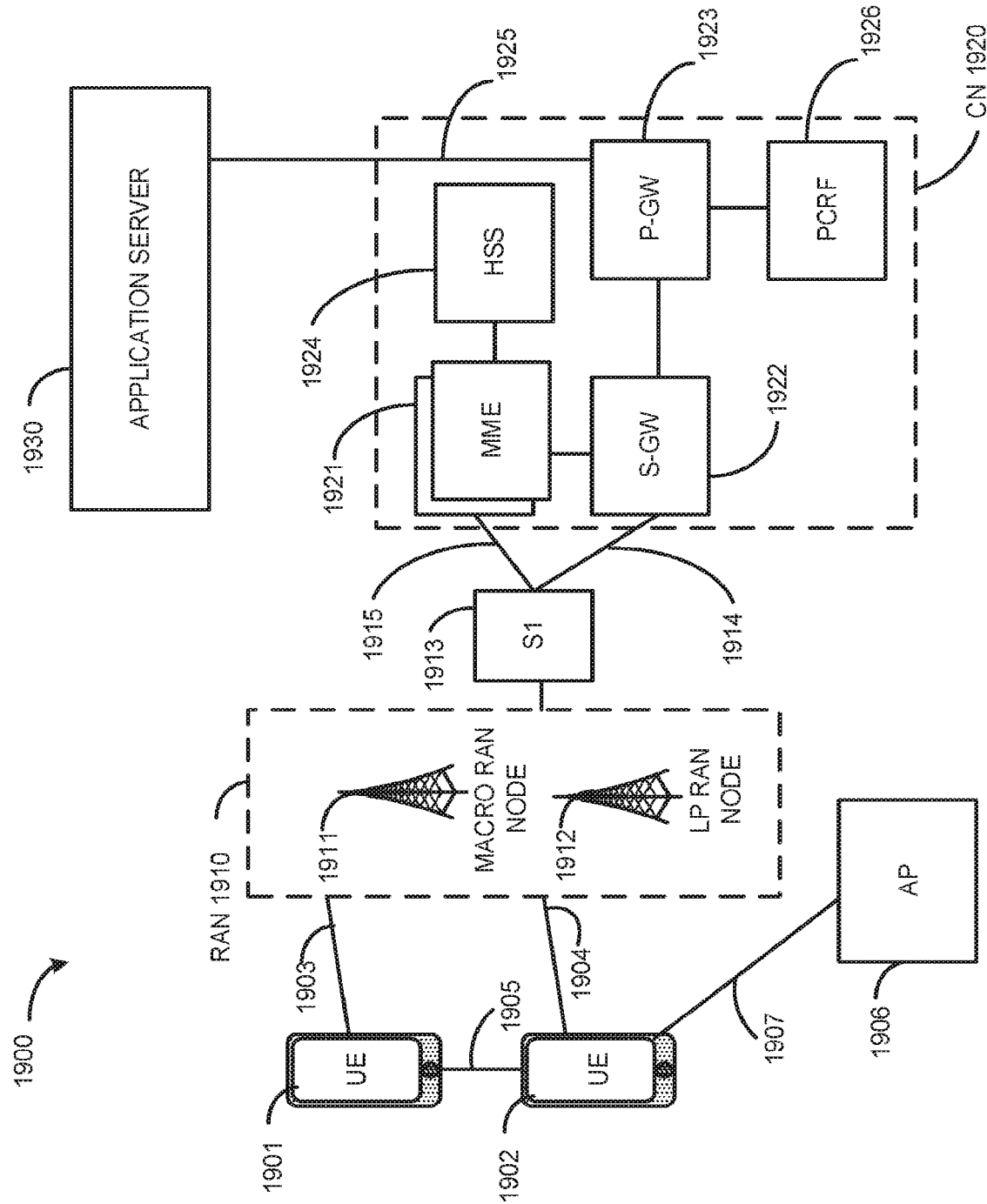
FIG. 19 illustrates an embodiment of a system architecture.

FIG. 19 illustrates an architecture of a system 1900 of a network in accordance with some embodiments. The system 1900 is shown to include a user equipment (UE) 1901 and a UE 1902. The UEs 1901 and 1902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1901 and 1902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1901 and 1902 may be configured to connect, e.g., communicatively couple, with a radio access network (RAN) 1910—the RAN 1910 may be, for example, an Evolved Universal Mobile Telecommunications System (UMTS) Terrestrial Radio Access Network (E-UTRAN), a NextGen RAN (NG RAN), or some other type of RAN. The UEs 1901 and 1902 utilize connections 1903 and 1904, respectively, each of which comprises a physical communications interface or layer (discussed in further detail below); in this example, the connections 1903 and 1904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1901 and 1902 may further directly exchange communication data via a ProSe interface 1905. The ProSe interface 1905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1902 is shown to be configured to access an access point (AP) 1906 via connection 1907. The connection 1907 can comprise a local wireless connection, such as a connection consistent with any IEEE 802.11 protocol, wherein the AP 1906 would comprise a wireless fidelity (WiFi®) router. In this example, the AP 1906 is shown to be connected to the Internet without connecting to the core network of the wireless system (described in further detail below).

The RAN 1910 can include one or more access nodes that enable the connections 1903 and 1904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1910 may include one or more RAN nodes for providing macrocells, e.g., macro RAN node 1911, and one or more RAN nodes for providing femtocells or picocells (e.g., cells having smaller coverage areas, smaller user capacity, or higher bandwidth compared to macrocells), e.g., low power (LP) RAN node 1912.

Any of the RAN nodes 1911 and 1912 can terminate the air interface protocol and can be the first point of contact for the UEs 1901 and 1902. In some embodiments, any of the RAN nodes 1911 and 1912 can fulfill various logical functions for the RAN 1910 including, but not limited to, radio network controller (RNC) functions such as radio bearer management, uplink and downlink dynamic radio resource management and data packet scheduling, and mobility management.

In accordance with some embodiments, the UEs 1901 and 1902 can be configured to communicate using Orthogonal Frequency-Division Multiplexing (OFDM) communication signals with each other or with any of the RAN nodes 1911 and 1912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1911 and 1912 to the UEs 1901 and 1902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1901 and 1902. The physical downlink control channel (PDCCH) may carry information about the transport format and resource allocations related to the PDSCH channel, among other things. It may also inform the UEs 1901 and 1902 about the transport format, resource allocation, and H-ARQ (Hybrid Automatic Repeat Request) information related to the uplink shared channel. Typically, downlink scheduling (assigning control and shared channel resource blocks to the UE 1902 within a cell) may be performed at any of the RAN nodes 1911 and 1912 based on channel quality information fed back from any of the UEs 1901 and 1902. The downlink resource assignment information may be sent on the PDCCH used for (e.g., assigned to) each of the UEs 1901 and 1902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1910 is shown to be communicatively coupled to a core network (CN) 1920—via an S1 interface 1913. In embodiments, the CN 1920 may be an evolved packet core (EPC) network, a NextGen Packet Core (NPC) network, or some other type of CN. In this embodiment the S1 interface 1913 is split into two parts: the S1-U interface 1914, which carries traffic data between the RAN nodes 1911 and 1912 and the serving gateway (S-GW) 1922, and the S1-mobility management entity (MME) interface 1915, which is a signaling interface between the RAN nodes 1911 and 1912 and MMEs 1921.

In this embodiment, the CN 1920 comprises the MMEs 1921, the S-GW 1922, the Packet Data Network (PDN) Gateway (P-GW) 1923, and a home subscriber server (HSS) 1924. The MMEs 1921 may be similar in function to the control plane of legacy Serving General Packet Radio Service (GPRS) Support Nodes (SGSN). The MMEs 1921 may manage mobility aspects in access such as gateway selection and tracking area list management. The HSS 1924 may comprise a database for network users, including subscription-related information to support the network entities' handling of communication sessions. The CN 1920 may comprise one or several HSSs 1924, depending on the number of mobile subscribers, on the capacity of the equipment, on the organization of the network, etc. For example, the HSS 1924 can provide support for routing/roaming, authentication, authorization, naming/addressing resolution, location dependencies, etc.

The S-GW 1922 may terminate the S1 interface 1913 towards the RAN 1910, and routes data packets between the RAN 1910 and the CN 1920. In addition, the S-GW 1922 may be a local mobility anchor point for inter-RAN node handovers and also may provide an anchor for inter-3GPP mobility. Other responsibilities may include lawful intercept, charging, and some policy enforcement.

The P-GW 1923 may terminate an SGi interface toward a PDN. The P-GW 1923 may route data packets between the CN 1920 and external networks such as a network including the application server 1930 (alternatively referred to as application function (AF)) via an Internet Protocol (IP) interface 1925. Generally, the application server 1930 may be an element offering applications that use IP bearer resources with the core network (e.g., UMTS Packet Services (PS) domain, LTE PS data services, etc.). In this embodiment, the P-GW 1923 is shown to be communicatively coupled to an application server 1930 via an IP communications interface 1925. The application server 1930 can also be configured to support one or more communication services (e.g., Voice-over-Internet Protocol (VoIP) sessions, PTT sessions, group communication sessions, social networking services, etc.) for the UEs 1901 and 1902 via the CN 1920.

The P-GW 1923 may further be a node for policy enforcement and charging data collection. Policy and Charging Enforcement Function (PCRF) 1926 is the policy and charging control element of the CN 1920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1926 may be communicatively coupled to the application server 1930 via the P-GW 1923. The application server 1930 may signal the PCRF 1926 to indicate a new service flow and select the appropriate Quality of Service (QoS) and charging parameters. The PCRF 1926 may provision this rule into a Policy and Charging Enforcement Function (PCEF) (not shown) with the appropriate traffic flow template (TFT) and QoS class of identifier (QCI), which commences the QoS and charging as specified by the application server 1930.

Figure 20:
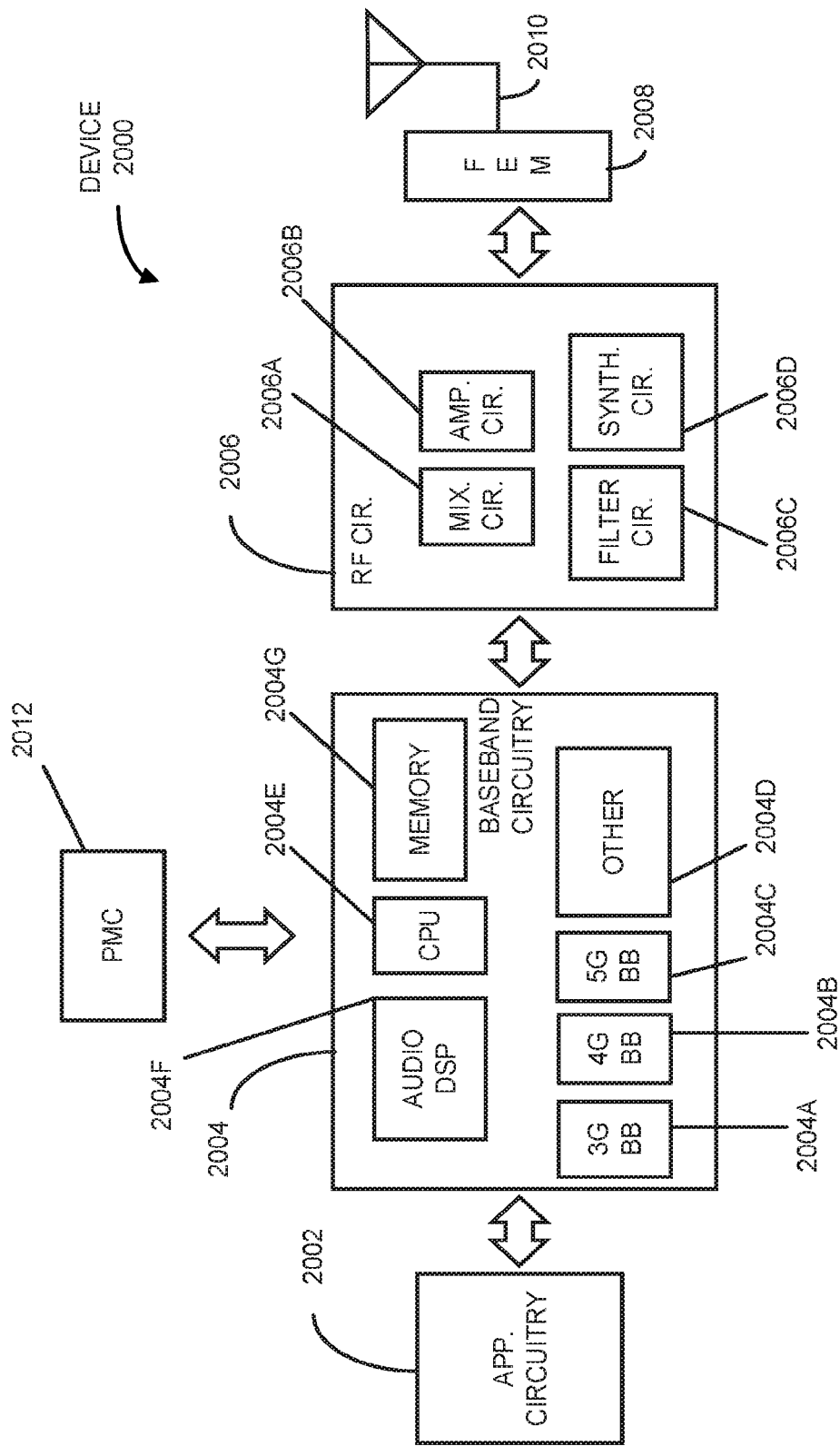
FIG. 20 illustrates an embodiment of a device.

FIG. 20 illustrates example components of a device 2000 in accordance with some embodiments. In some embodiments, the device 2000 may include application circuitry 2002, baseband circuitry 2004, Radio Frequency (RF) circuitry 2006, front-end module (FEM) circuitry 2008, one or more antennas 2010, and power management circuitry (PMC) 2012 coupled together at least as shown. The components of the illustrated device 2000 may be included in a UE or a RAN node. In some embodiments, the device 2000 may include less elements (e.g., a RAN node may not utilize application circuitry 2002, and instead include a processor/controller to process IP data received from an EPC). In some embodiments, the device 2000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2002 may include one or more application processors. For example, the application circuitry 2002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2000. In some embodiments, processors of application circuitry 2002 may process IP data packets received from an EPC.

The baseband circuitry 2004 may include circuitry such as, but not limited to, one or more single-core or multi-core processors. The baseband circuitry 2004 may include one or more baseband processors or control logic to process baseband signals received from a receive signal path of the RF circuitry 2006 and to generate baseband signals for a transmit signal path of the RF circuitry 2006. Baseband processing circuitry 2004 may interface with the application circuitry 2002 for generation and processing of the baseband signals and for controlling operations of the RF circuitry 2006. For example, in some embodiments, the baseband circuitry 2004 may include a third generation (3G) baseband processor 2004A, a fourth generation (4G) baseband processor 2004B, a fifth generation (5G) baseband processor 2004C, or other baseband processor(s) 2004D for other existing generations, generations in development or to be developed in the future (e.g., second generation (2G), sixth generation (6G), etc.). The baseband circuitry 2004 (e.g., one or more of baseband processors 2004A-D) may handle various radio control functions that enable communication with one or more radio networks via the RF circuitry 2006. In other embodiments, some or all of the functionality of baseband processors 2004A-D may be included in modules stored in the memory 2004G and executed via a Central Processing Unit (CPU) 2004E. The radio control functions may include, but are not limited to, signal modulation/demodulation, encoding/decoding, radio frequency shifting, etc. In some embodiments, modulation/demodulation circuitry of the baseband circuitry 2004 may include Fast-Fourier Transform (FFT), precoding, or constellation mapping/demapping functionality. In some embodiments, encoding/decoding circuitry of the baseband circuitry 2004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2004 may include one or more audio digital signal processor(s) (DSP) 2004F. The audio DSP(s) 2004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2004 and the application circuitry 2002 may be implemented together such as, for example, on a system on a chip (SOC).

In some embodiments, the baseband circuitry 2004 may provide for communication compatible with one or more radio technologies. For example, in some embodiments, the baseband circuitry 2004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 2004 is configured to support radio communications of more than one wireless protocol may be referred to as multi-mode baseband circuitry.

RF circuitry 2006 may enable communication with wireless networks using modulated electromagnetic radiation through a non-solid medium. In various embodiments, the RF circuitry 2006 may include switches, filters, amplifiers, etc. to facilitate the communication with the wireless network. RF circuitry 2006 may include a receive signal path which may include circuitry to down-convert RF signals received from the FEM circuitry 2008 and provide baseband signals to the baseband circuitry 2004. RF circuitry 2006 may also include a transmit signal path which may include circuitry to up-convert baseband signals provided by the baseband circuitry 2004 and provide RF output signals to the FEM circuitry 2008 for transmission.

In some embodiments, the receive signal path of the RF circuitry 2006 may include mixer circuitry 2006a, amplifier circuitry 2006b and filter circuitry 2006c. In some embodiments, the transmit signal path of the RF circuitry 2006 may include filter circuitry 2006c and mixer circuitry 2006a. RF circuitry 2006 may also include synthesizer circuitry 2006d for synthesizing a frequency for use by the mixer circuitry 2006a of the receive signal path and the transmit signal path. In some embodiments, the mixer circuitry 2006a of the receive signal path may be configured to down-convert RF signals received from the FEM circuitry 2008 based on the synthesized frequency provided by synthesizer circuitry 2006d. The amplifier circuitry 2006b may be configured to amplify the down-converted signals and the filter circuitry 2006c may be a low-pass filter (LPF) or band-pass filter (BPF) configured to remove unwanted signals from the down-converted signals to generate output baseband signals. Output baseband signals may be provided to the baseband circuitry 2004 for further processing. In some embodiments, the output baseband signals may be zero-frequency baseband signals, although this is not a requirement. In some embodiments, mixer circuitry 2006a of the receive signal path may comprise passive mixers, although the scope of the embodiments is not limited in this respect.

In some embodiments, the mixer circuitry 2006a of the transmit signal path may be configured to up-convert input baseband signals based on the synthesized frequency provided by the synthesizer circuitry 2006d to generate RF output signals for the FEM circuitry 2008. The baseband signals may be provided by the baseband circuitry 2004 and may be filtered by filter circuitry 2006c.

In some embodiments, the mixer circuitry 2006a of the receive signal path and the mixer circuitry 2006a of the transmit signal path may include two or more mixers and may be arranged for quadrature downconversion and upconversion, respectively. In some embodiments, the mixer circuitry 2006a of the receive signal path and the mixer circuitry 2006a of the transmit signal path may include two or more mixers and may be arranged for image rejection (e.g., Hartley image rejection). In some embodiments, the mixer circuitry 2006a of the receive signal path and the mixer circuitry 2006a may be arranged for direct downconversion and direct upconversion, respectively. In some embodiments, the mixer circuitry 2006a of the receive signal path and the mixer circuitry 2006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2006 may include analog-to-digital converter (ADC) and digital-to-analog converter (DAC) circuitry and the baseband circuitry 2004 may include a digital baseband interface to communicate with the RF circuitry 2006.

In some dual-mode embodiments, a separate radio IC circuitry may be provided for processing signals for each spectrum, although the scope of the embodiments is not limited in this respect.

In some embodiments, the synthesizer circuitry 2006d may be a fractional-N synthesizer or a fractional N/N+1 synthesizer, although the scope of the embodiments is not limited in this respect as other types of frequency synthesizers may be suitable. For example, synthesizer circuitry 2006d may be a delta-sigma synthesizer, a frequency multiplier, or a synthesizer comprising a phase-locked loop with a frequency divider.

The synthesizer circuitry 2006d may be configured to synthesize an output frequency for use by the mixer circuitry 2006a of the RF circuitry 2006 based on a frequency input and a divider control input. In some embodiments, the synthesizer circuitry 2006d may be a fractional N/N+1 synthesizer.

In some embodiments, frequency input may be provided by a voltage controlled oscillator (VCO), although that is not a requirement. Divider control input may be provided by either the baseband circuitry 2004 or the applications processor 2002 depending on the desired output frequency. In some embodiments, a divider control input (e.g., N) may be determined from a look-up table based on a channel indicated by the applications processor 2002.

Synthesizer circuitry 2006d of the RF circuitry 2006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2006 may include an IQ/polar converter.

FEM circuitry 2008 may include a receive signal path which may include circuitry configured to operate on RF signals received from one or more antennas 2010, amplify the received signals and provide the amplified versions of the received signals to the RF circuitry 2006 for further processing. FEM circuitry 2008 may also include a transmit signal path which may include circuitry configured to amplify signals for transmission provided by the RF circuitry 2006 for transmission by one or more of the one or more antennas 2010. In various embodiments, the amplification through the transmit or receive signal paths may be done solely in the RF circuitry 2006, solely in the FEM 2008, or in both the RF circuitry 2006 and the FEM 2008.

In some embodiments, the FEM circuitry 2008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2006). The transmit signal path of the FEM circuitry 2008 may include a power amplifier (PA) to amplify input RF signals (e.g., provided by RF circuitry 2006), and one or more filters to generate RF signals for subsequent transmission (e.g., by one or more of the one or more antennas 2010).

In some embodiments, the PMC 2012 may manage power provided to the baseband circuitry 2004. In particular, the PMC 2012 may control power-source selection, voltage scaling, battery charging, or DC-to-DC conversion. The PMC 2012 may often be included when the device 2000 is capable of being powered by a battery, for example, when the device is included in a UE. The PMC 2012 may increase the power conversion efficiency while providing desirable implementation size and heat dissipation characteristics.

FIG. 20 shows the PMC 2012 coupled only with the baseband circuitry 2004. However, in other embodiments, the PMC 2012 may be additionally or alternatively coupled with, and perform similar power management operations for, other components such as, but not limited to, application circuitry 2002, RF circuitry 2006, or FEM 2008.

In some embodiments, the PMC 2012 may control, or otherwise be part of, various power saving mechanisms of the device 2000. For example, if the device 2000 is in an RRC_Connected state, where it is still connected to the RAN node as it expects to receive traffic shortly, then it may enter a state known as Discontinuous Reception Mode (DRX) after a period of inactivity. During this state, the device 2000 may power down for brief intervals of time and thus save power.

If there is no data traffic activity for an extended period of time, then the device 2000 may transition off to an RRC_Idle state, where it disconnects from the network and does not perform operations such as channel quality feedback, handover, etc. The device 2000 goes into a very low power state and it performs paging where again it periodically wakes up to listen to the network and then powers down again. The device 2000 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2002 and processors of the baseband circuitry 2004 may be used to execute elements of one or more instances of a protocol stack. For example, processors of the baseband circuitry 2004, alone or in combination, may be used execute Layer 3, Layer 2, or Layer 1 functionality, while processors of the application circuitry 2004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 21:
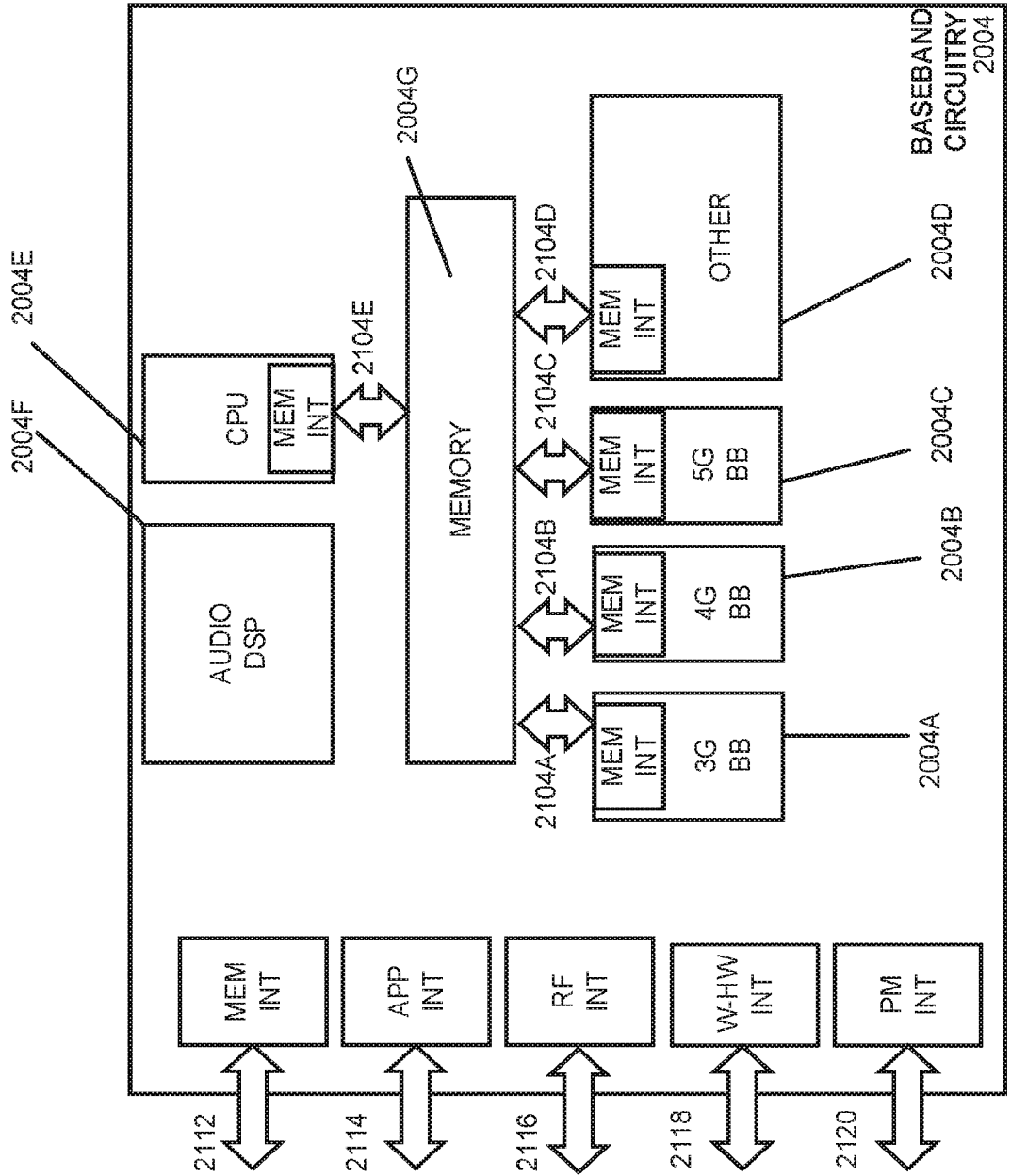
FIG. 21 illustrates an embodiment of baseband circuitry.

FIG. 21 illustrates example interfaces of baseband circuitry in accordance with some embodiments. As discussed above, the baseband circuitry 2004 of FIG. 20 may comprise processors 2004A-2004E and a memory 2004G utilized by said processors. Each of the processors 2004A-2004E may include a memory interface, 2104A-2104E, respectively, to send/receive data to/from the memory 2004G.

The baseband circuitry 2004 may further include one or more interfaces to communicatively couple to other circuitries/devices, such as a memory interface 2112 (e.g., an interface to send/receive data to/from memory external to the baseband circuitry 2004), an application circuitry interface 2114 (e.g., an interface to send/receive data to/from the application circuitry 2002 of FIG. 20), an RF circuitry interface 2116 (e.g., an interface to send/receive data to/from RF circuitry 2006 of FIG. 20), a wireless hardware connectivity interface 2118 (e.g., an interface to send/receive data to/from Near Field Communication (NFC) components, Bluetooth® components (e.g., Bluetooth® Low Energy), Wi-Fi® components, and other communication components), and a power management interface 2120 (e.g., an interface to send/receive power or control signals to/from the PMC 2012.

Figure 22:
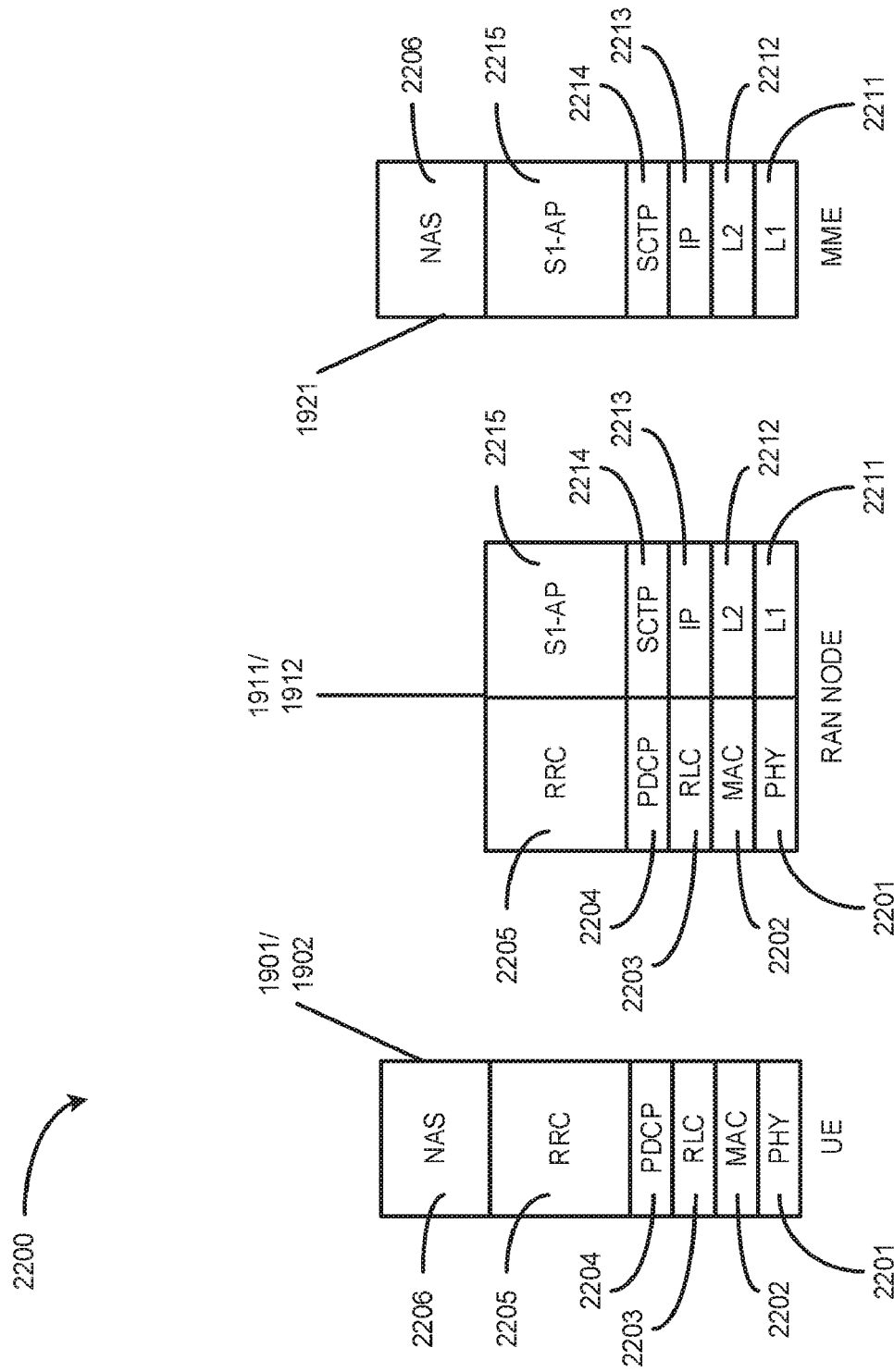
FIG. 22 illustrates an embodiment of a control plane protocol stack.

FIG. 22 is an illustration of a control plane protocol stack in accordance with some embodiments. In this embodiment, a control plane 2200 is shown as a communications protocol stack between the UE 1901 (or alternatively, the UE 1902), the RAN node 1911 (or alternatively, the RAN node 1912), and the MME 1921.

The PHY layer 2201 may transmit or receive information used by the MAC layer 2202 over one or more air interfaces. The PHY layer 2201 may further perform link adaptation or adaptive modulation and coding (AMC), power control, cell search (e.g., for initial synchronization and handover purposes), and other measurements used by higher layers, such as the RRC layer 2205. The PHY layer 2201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 2202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 2203 may operate in a plurality of modes of operation, including: Transparent Mode (TM), Unacknowledged Mode (UM), and Acknowledged Mode (AM). The RLC layer 2203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 2203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 2204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 2205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1901 and the RAN node 1911 may utilize a Uu interface (e.g., an LTE-Uu interface) to exchange control plane data via a protocol stack comprising the PHY layer 2201, the MAC layer 2202, the RLC layer 2203, the PDCP layer 2204, and the RRC layer 2205.

The non-access stratum (NAS) protocols 2206 form the highest stratum of the control plane between the UE 1901 and the MME 1921. The NAS protocols 2206 support the mobility of the UE 1901 and the session management procedures to establish and maintain IP connectivity between the UE 1901 and the P-GW 1923.

The S1 Application Protocol (S1-AP) layer 2215 may support the functions of the S1 interface and comprise Elementary Procedures (EPs). An EP is a unit of interaction between the RAN node 1911 and the CN 1920. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 2214 may ensure reliable delivery of signaling messages between the RAN node 1911 and the MME 1921 based, in part, on the IP protocol, supported by the IP layer 2213. The L2 layer 2212 and the L1 layer 2211 may refer to communication links (e.g., wired or wireless) used by the RAN node and the MME to exchange information.

The RAN node 1911 and the MME 1921 may utilize an S1-MME interface to exchange control plane data via a protocol stack comprising the L1 layer 2211, the L2 layer 2212, the IP layer 2213, the SCTP layer 2214, and the S1-AP layer 2215.

Figure 23:
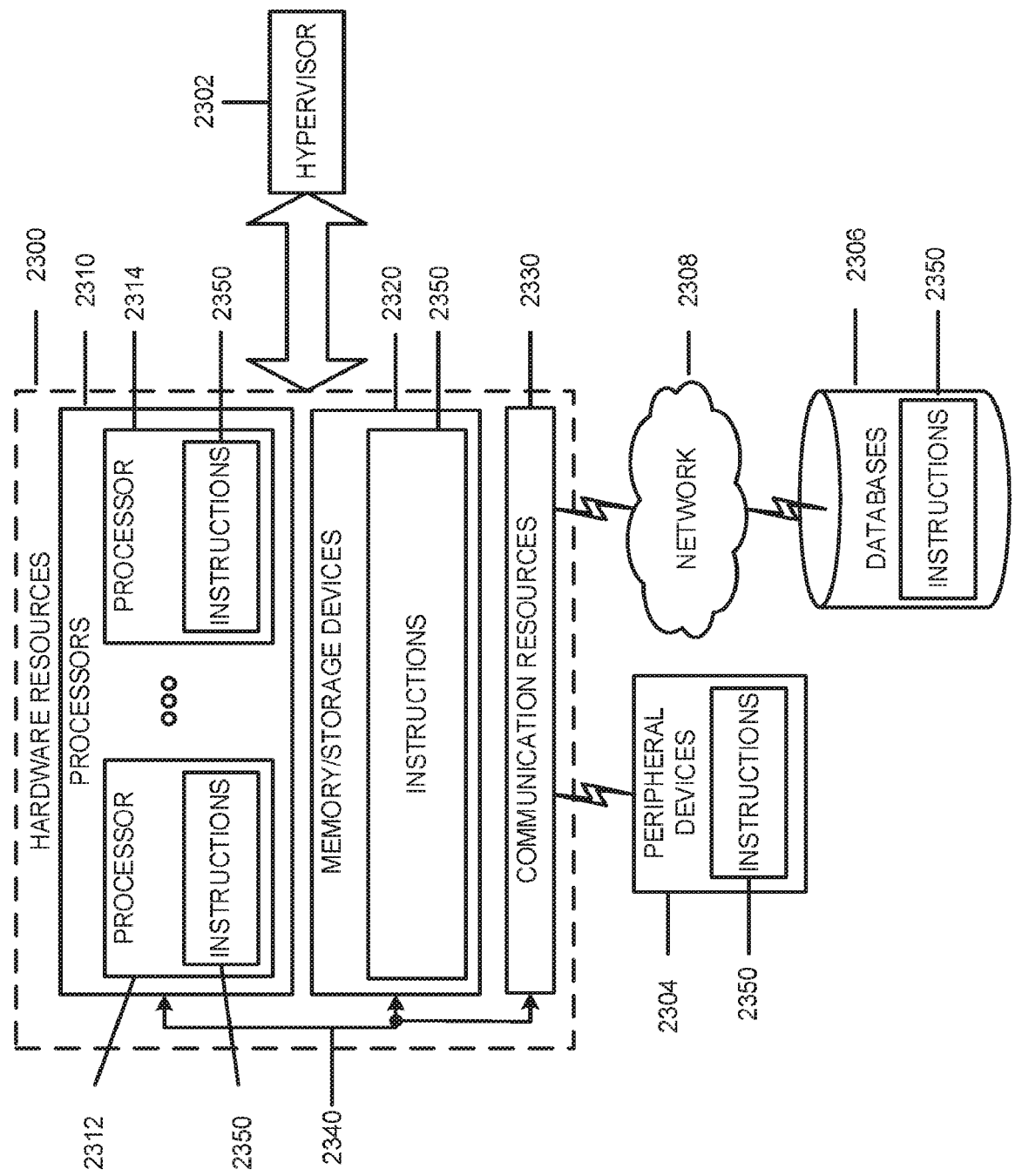
FIG. 23 illustrates an embodiment of a set of hardware resources.

FIG. 23 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 23 shows a diagrammatic representation of hardware resources 2300 including one or more processors (or processor cores) 2310, one or more memory/storage devices 2320, and one or more communication resources 2330, each of which may be communicatively coupled via a bus 2340. For embodiments where node virtualization (e.g., NFV) is utilized, a hypervisor 2302 may be executed to provide an execution environment for one or more network slices/sub-slices to utilize the hardware resources 2300

The processors 2310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2312 and a processor 2314.

The memory/storage devices 2320 may include main memory, disk storage, or any suitable combination thereof. The memory/storage devices 2320 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2330 may include interconnection or network interface components or other suitable devices to communicate with one or more peripheral devices 2304 or one or more databases 2306 via a network 2308. For example, the communication resources 2330 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2350 may comprise software, a program, an application, an applet, an app, or other executable code for causing at least any of the processors 2310 to perform any one or more of the methodologies discussed herein. The instructions 2350 may reside, completely or partially, within at least one of the processors 2310 (e.g., within the processor's cache memory), the memory/storage devices 2320, or any suitable combination thereof. Furthermore, any portion of the instructions 2350 may be transferred to the hardware resources 2300 from any combination of the peripheral devices 2304 or the databases 2306. Accordingly, the memory of processors 2310, the memory/storage devices 2320, the peripheral devices 2304, and the databases 2306 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, ASICs, programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following examples pertain to further embodiments:

Example 1 is a method, comprising detecting downlink control information (DCI) scheduling a downlink (DL) data transmission during a random access procedure in a next generation radio access network (NG-RAN) cell, identifying an applicable slot offset value for the DL data transmission, identifying a scheduled slot for the DL data transmission based on a slot of receipt of the DCI and the applicable slot offset value, and accessing a DL wireless channel of the NG-RAN cell during the scheduled slot to receive the DL data transmission.

Example 2 is the method of Example 1, comprising identifying the applicable slot offset value based on an indication comprised in a master information block (MIB) for the NG-RAN cell.

Example 3 is the method of Example 1, comprising identifying the applicable slot offset value based on an indication comprised in a system information block (SIB) for the NG-RAN cell.

Example 4 is the method of Example 1, the DCI to comprise a direct indication of the applicable slot offset value.

Example 5 is the method of Example 1, comprising identifying the applicable slot offset value based on an identity of a physical random access channel (PRACH) resource used for transmission of a random access preamble during the random access procedure.

Example 6 is the method of Example 5, comprising identifying a PRACH resource set comprising the PRACH resource, and identifying the applicable slot offset value based on an identity of the identified PRACH resource set.

Example 7 is the method of Example 1, comprising identifying one of a plurality of values in a value set as the applicable slot offset value, based on an indicator comprised in the DCI.

Example 8 is the method of Example 7, comprising identifying the value set based on information comprised in a master information block (MIB) for the NG-RAN cell.

Example 9 is the method of any one of Examples 7 to 8, comprising identifying the value set based on information comprised in a system information block (SIB) for the NG-RAN cell.

Example 10 is the method of any one of Examples 7 to 9, comprising identifying the value set based on an identity of a physical random access channel (PRACH) resource used to transmit a random access preamble during the random access procedure.

Example 11 is the method of Example 10, comprising identifying a PRACH resource set comprising the PRACH resource, and identifying the value set based on an identity of the PRACH resource set.

Example 12 is the method of any one of Examples 7 to 11, comprising identifying the applicable slot offset value based on an identity of a physical downlink control channel (PDCCH) resource used for transmission of the DCI.

Example 13 is the method of Example 12, comprising identifying a PDCCH resource set comprising the PDCCH resource, and identifying the applicable slot offset value based on an identity of the identified PDCCH resource set.

Example 14 is the method of Example 1, comprising identifying a delay value based on information comprised in the DCI, and identifying the applicable slot offset value by adding the identified delay value to a base value.

Example 15 is the method of Example 14, comprising identifying one or both of the applicable delay value and the base value based on an identity of a physical random access channel (PRACH) resource used for transmission of a random access preamble during the random access procedure.

Example 16 is the method of any one of Examples 14 to 15, comprising identifying one or both of the applicable delay value and the base value based on an identity of a physical downlink control channel (PDCCH) resource used for transmission of the DCI.

Example 17 is the method of Example 14, the DCI to comprise a direct indication of the delay value.

Example 18 is the method of Example 14, comprising identifying one of a plurality of values in a value set as the delay value, based on an indicator comprised in the DCI.

Example 19 is the method of Example 18, comprising identifying the value set based on information comprised in a master information block (MIB) for the NG-RAN cell.

Example 20 is the method of any one of Examples 18 to 19, comprising identifying the value set based on information comprised in a system information block (SIB) for the NG-RAN cell.

Example 21 is the method of any one of Examples 18 to 20, comprising identifying the value set based on an identity of a physical random access channel (PRACH) resource used to transmit a random access preamble during the random access procedure.

Example 22 is the method of Example 21, comprising identifying a PRACH resource set comprising the PRACH resource, and identifying the value set based on an identity of the PRACH resource set.

Example 23 is the method of any one of Examples 18 to 22, comprising identifying the applicable slot offset value based on an identity of a physical downlink control channel (PDCCH) resource used for transmission of the DCI.

Example 24 is the method of Example 23, comprising identifying a PDCCH resource set comprising the PDCCH resource, and identifying the applicable slot offset value based on an identity of the identified PDCCH resource set.

Example 25 is the method of any one of Examples 1 to 24, the DL data transmission to comprise a random access response message.

Example 26 is the method of any one of Examples 1 to 24, the DL data transmission to comprise a contention resolution message.

Example 27 is the method of any one of Examples 1 to 26, the DL wireless channel to comprise a physical downlink shared channel (PDSCH) of the NG-RAN cell.

Example 28 is an apparatus, comprising a memory interface, and circuitry for user equipment (UE), the circuitry to perform the method of any one of Examples 1 to 27.

Example 29 is a device, comprising the apparatus of Example 28, one or more application processors, radio frequency (RF) circuitry, and one or more RF antennas.

Example 30 is user equipment (UE), comprising radio frequency (RF) circuitry, and baseband circuitry coupled to the RF circuitry, the baseband circuitry to perform the method of any one of Examples 1 to 27.

Example 31 is at least one computer-readable storage medium having stored thereon instructions that, when executed by processing circuitry of user equipment (UE), cause the UE to perform the method of any one of Examples 1 to 27.

Example 32 is an apparatus, comprising means for performing the method of any one of Examples 1 to 27.

Example 33 is user equipment (UE), comprising the apparatus of Example 32, one or more application processors, radio frequency (RF) circuitry, and one or more RF antennas.

Example 34 is a method, comprising detecting receipt of a downlink (DL) transmission comprising a grant of resources for an uplink (UL) data transmission during a random access procedure in a next generation radio access network (NG-RAN) cell, identifying an applicable slot offset value for the UL data transmission, identifying a scheduled slot for the UL data transmission based on a slot of receipt of the DL transmission, and the applicable slot offset value, and encoding data for transmission over a UL wireless channel of the NG-RAN cell during the scheduled slot.

Example 35 is the method of Example 34, comprising identifying the applicable slot offset value based on an indication comprised in a master information block (MIB) for the NG-RAN cell.

Example 36 is the method of Example 34, comprising identifying the applicable slot offset value based on an indication comprised in a system information block (SIB) for the NG-RAN cell.

Example 37 is the method of Example 34, the DL transmission to comprise a direct indication of the applicable slot offset value.

Example 38 is the method of Example 34, comprising identifying the applicable slot offset value based on an identity of a physical random access channel (PRACH) resource used for transmission of a random access preamble during the random access procedure.

Example 39 is the method of Example 38, comprising identifying a PRACH resource set comprising the PRACH resource, and identifying the applicable slot offset value based on an identity of the identified PRACH resource set.

Example 40 is the method of Example 34, comprising identifying one of a plurality of values in a value set as the applicable slot offset value, based on an indicator comprised in the DL transmission.

Example 41 is the method of Example 40, comprising identifying the value set based on information comprised in a master information block (MIB) for the NG-RAN cell.

Example 42 is the method of any one of Examples 40 to 41, comprising identifying the value set based on information comprised in a system information block (SIB) for the NG-RAN cell.

Example 43 is the method of any one of Examples 40 to 42, comprising identifying the value set based on an identity of a physical random access channel (PRACH) resource used to transmit a random access preamble during the random access procedure.

Example 44 is the method of Example 43, comprising identifying a PRACH resource set comprising the PRACH resource, and identifying the value set based on an identity of the PRACH resource set.

Example 45 is the method of Example 34, comprising identifying a delay value based on information comprised in the DL transmission, and identifying the applicable slot offset value by adding the identified delay value to a base value.

Example 46 is the method of Example 45, comprising identifying one or both of the applicable delay value and the base value based on an identity of a physical random access channel (PRACH) resource used for transmission of a random access preamble during the random access procedure.

Example 47 is the method of Example 45, the DL transmission to comprise a direct indication of the delay value.

Example 48 is the method of Example 45, comprising identifying one of a plurality of values in a value set as the delay value, based on an indicator comprised in the DL transmission.

Example 49 is the method of Example 48, comprising identifying the value set based on information comprised in a master information block (MIB) for the NG-RAN cell.

Example 50 is the method of any one of Examples 48 to 49, comprising identifying the value set based on information comprised in a system information block (SIB) for the NG-RAN cell.

Example 51 is the method of any one of Examples 48 to 50, comprising identifying the value set based on an identity of a physical random access channel (PRACH) resource used to transmit a random access preamble during the random access procedure.

Example 52 is the method of Example 51, comprising identifying a PRACH resource set comprising the PRACH resource, and identifying the value set based on an identity of the PRACH resource set.

Example 53 is the method of any one of Examples 34 to 52, the data to comprise a radio resource control (RRC) message.

Example 54 is the method of Example 53, the RRC message to comprise an RRC Connection Request message.

Example 55 is the method of any one of Examples 34 to 54, the UL wireless channel to comprise a physical uplink shared channel (PUSCH) of the NG-RAN cell.

Example 56 is the method of any one of Examples 34 to 55, the DL transmission to comprise a random access response message.

Example 57 is the method of any one of Examples 34 to 55, the DL transmission to comprise downlink control information.

Example 58 is an apparatus, comprising a memory interface, and circuitry for user equipment (UE), the circuitry to perform the method of any one of Examples 34 to 57.

Example 59 is a device, comprising the apparatus of Example 58, one or more application processors, radio frequency (RF) circuitry, and one or more RF antennas.

Example 60 is user equipment (UE), comprising radio frequency (RF) circuitry, and baseband circuitry coupled to the RF circuitry, the baseband circuitry to perform the method of any one of Examples 34 to 57.

Example 61 is at least one computer-readable storage medium having stored thereon instructions that, when executed by processing circuitry of user equipment (UE), cause the UE to perform the method of any one of Examples 34 to 57.

Example 62 is an apparatus, comprising means for performing the method of any one of Examples 34 to 57.

Example 63 is user equipment (UE), comprising the apparatus of Example 62, one or more application processors, radio frequency (RF) circuitry, and one or more RF antennas.

Example 64 is a method, comprising detecting downlink control information (DCI) scheduling a downlink (DL) data transmission during a random access procedure in a next generation radio access network (NG-RAN) cell, accessing a DL wireless channel to receive the DL data transmission, identifying a slot offset value applicable to transmission of hybrid automatic repeat request (HARQ) feedback for a message comprised in the DL data transmission, identifying slot during which to transmit the HARQ feedback based on a slot of receipt of the DL data transmission, and the applicable slot offset value, and generating the HARQ feedback for transmission over a UL wireless channel of the NG-RAN cell during the identified slot.

Example 65 is the method of Example 64, comprising identifying the applicable slot offset value based on an indication comprised in a master information block (MTB) for the NG-RAN cell.

Example 66 is the method of Example 64, comprising identifying the applicable slot offset value based on an indication comprised in a system information block (SIB) for the NG-RAN cell.

Example 67 is the method of Example 64, the DCI to comprise a direct indication of the applicable slot offset value.

Example 68 is the method of Example 64, comprising identifying the applicable slot offset value based on an identity of a physical random access channel (PRACH) resource used for transmission of a random access preamble during the random access procedure.

Example 69 is the method of Example 68, comprising identifying a PRACH resource set comprising the PRACH resource, and identifying the applicable slot offset value based on an identity of the identified PRACH resource set.

Example 70 is the method of Example 64, comprising identifying one of a plurality of values in a value set as the applicable slot offset value, based on an indicator comprised in the DCI.

Example 71 is the method of Example 70, comprising identifying the value set based on information comprised in a master information block (MIB) for the NG-RAN cell.

Example 72 is the method of any one of Examples 70 to 71, comprising identifying the value set based on information comprised in a system information block (SIB) for the NG-RAN cell.

Example 73 is the method of any one of Examples 70 to 72, comprising identifying the value set based on an identity of a physical random access channel (PRACH) resource used to transmit a random access preamble during the random access procedure.

Example 74 is the method of Example 73, comprising identifying a PRACH resource set comprising the PRACH resource, and identifying the value set based on an identity of the PRACH resource set.

Example 75 is the method of any one of Examples 70 to 74, comprising identifying the applicable slot offset value based on an identity of a physical downlink control channel (PDCCH) resource used for transmission of the DCI.

Example 76 is the method of Example 75, comprising identifying a PDCCH resource set comprising the PDCCH resource, and identifying the applicable slot offset value based on an identity of the identified PDCCH resource set.

Example 77 is the method of Example 64, comprising identifying a delay value based on information comprised in the DCI, and identifying the applicable slot offset value by adding the identified delay value to a base value.

Example 78 is the method of Example 77, comprising identifying one or both of the applicable delay value and the base value based on an identity of a physical random access channel (PRACH) resource used for transmission of a random access preamble during the random access procedure.

Example 79 is the method of any one of Examples 77 to 78, comprising identifying one or both of the applicable delay value and the base value based on an identity of a physical downlink control channel (PDCCH) resource used for transmission of the DCL Example 80 is the method of Example 77, the DCI to comprise a direct indication of the delay value.

Example 81 is the method of Example 77, comprising identifying one of a plurality of values in a value set as the delay value, based on an indicator comprised in the DCI.

Example 82 is the method of Example 81, comprising identifying the value set based on information comprised in a master information block (MIB) for the NG-RAN cell.

Example 83 is the method of any one of Examples 81 to 82, comprising identifying the value set based on information comprised in a system information block (SIB) for the NG-RAN cell.

Example 84 is the method of any one of Examples 81 to 83, comprising identifying the value set based on an identity of a physical random access channel (PRACH) resource used to transmit a random access preamble during the random access procedure.

Example 85 is the method of Example 84, comprising identifying a PRACH resource set comprising the PRACH resource, and identifying the value set based on an identity of the PRACH resource set.

Example 86 is the method of any one of Examples 81 to 85, comprising identifying the applicable slot offset value based on an identity of a physical downlink control channel (PDCCH) resource used for transmission of the DCI.

Example 87 is the method of Example 86, comprising identifying a PDCCH resource set comprising the PDCCH resource, and identifying the applicable slot offset value based on an identity of the identified PDCCH resource set.

Example 88 is the method of any one of Examples 64 to 87, the message to comprise a random access response message.

Example 89 is the method of any one of Examples 64 to 87, the message to comprise a contention resolution message.

Example 90 is the method of any one of Examples 64 to 89, the DL wireless channel to comprise a physical downlink shared channel (PDSCH) of the NG-RAN cell.

Example 91 is the method of any one of Examples 64 to 90, the UL wireless channel to comprise a physical uplink control channel (PUCCH) of the NG-RAN cell.

Example 92 is an apparatus, comprising a memory interface, and circuitry for user equipment (UE), the circuitry to perform the method of any one of Examples 64 to 91.

Example 93 is a device, comprising the apparatus of Example 92, one or more application processors, radio frequency (RF) circuitry, and one or more RF antennas.

Example 94 is user equipment (UE), comprising radio frequency (RF) circuitry, and baseband circuitry coupled to the RF circuitry, the baseband circuitry to perform the method of any one of Examples 64 to 91.

Example 95 is at least one computer-readable storage medium having stored thereon instructions that, when executed by processing circuitry of user equipment (UE), cause the UE to perform the method of any one of Examples 64 to 91.

Example 96 is an apparatus, comprising means for performing the method of any one of Examples 64 to 91.

Example 97 is user equipment (UE), comprising the apparatus of Example 96, one or more application processors, radio frequency (RF) circuitry, and one or more RF antennas.

Example 98 is a method, comprising transmitting a random access preamble to initiate a random access procedure in a next generation radio access network (NG-RAN) cell, detecting downlink control information (DCI) scheduling a data transmission over a wireless channel of the NG-RAN cell during the random access procedure, identifying a scheduled slot for the data transmission based on a slot of receipt of the DCI and a slot offset value applicable to the data transmission, and accessing the wireless channel during the scheduled slot.

Example 99 is the method of Example 98, the DCI to comprise a direct indication of the applicable slot offset value.

Example 100 is the method of Example 98, comprising identifying one of a plurality of values in a value set as the applicable slot offset value based on information comprised in the DCI.

Example 101 is the method of Example 98, comprising identifying a delay value based on information comprised in the DCI, and identifying the applicable slot offset value by adding the delay value to a base value.

Example 102 is the method of any one of Examples 98 to 101, comprising identifying the applicable slot offset value based on one or both of information comprised in a master information block (MIB) for the NG-RAN cell, and information comprised in a system information block (SIB) for the NG-RAN cell.

Example 103 is the method of any one of Examples 98 to 101, comprising identifying the applicable slot offset value based on one or both of an identity of a physical random access channel (PRACH) resource used for transmission of a random access preamble during the random access procedure, and an identity of a physical downlink control channel (PDCCH) resource used for transmission of the DCI.

Example 104 is the method of any of Examples 98 to 101, the data transmission to comprise a downlink (DL) transmission over a physical downlink shared channel (PDSCH) of data comprising a random access response message or a contention resolution message.

Example 105 is the method of any of Examples 98 to 101, the data transmission to comprise an uplink (UL) transmission over a physical uplink shared channel (PUSCH) of data comprising a Radio Resource Control (RRC) Connection Request message.

Example 106 is an apparatus, comprising a memory interface, and circuitry for user equipment (UE), the circuitry to perform the method of any one of Examples 98 to 105.

Example 107 is a device, comprising the apparatus of Example 106, one or more application processors, radio frequency (RF) circuitry, and one or more RF antennas.

Example 108 is user equipment (UE), comprising radio frequency (RF) circuitry, and baseband circuitry coupled to the RF circuitry, the baseband circuitry to perform the method of any one of Examples 98 to 105.

Example 109 is at least one computer-readable storage medium having stored thereon instructions that, when executed by processing circuitry of user equipment (UE), cause the UE to perform the method of any one of Examples 98 to 105.

Example 110 is an apparatus, comprising means for performing the method of any one of Examples 98 to 105.

Example 111 is user equipment (UE), comprising the apparatus of Example 110, one or more application processors, radio frequency (RF) circuitry, and one or more RF antennas.]

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be noted that the methods described herein do not necessarily have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided merely to allow the reader to ascertain the general nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for a User Equipment (UE), comprising:
a memory; and
one or more processors coupled to the memory, wherein the one or more processors are configured to:
receive, from a base station, a grant of resources for an uplink (UL) data transmission in a random access response (RAR) message during a random access procedure;
identify a scheduled slot for the UL data transmission based on a received slot of the RAR message and an applicable slot offset value indicating a number of slots by which the received slot precedes the scheduled slot;
identify the applicable slot offset value based on a value set and an indicator comprised in the RAR message, wherein the applicable slot offset value comprises a delay value, wherein the applicable slot offset value is identified by adding the delay value to a base value, and wherein the base value is indicated in a system information block (SIB); and
transmit the UL data over a physical uplink shared channel (PUSCH) during the scheduled slot.

2. The apparatus of claim 1, wherein the applicable slot offset value is identified based on information comprised in a master information block (MIB).

3. The apparatus of claim 1, wherein the one or more processors are further configured to:
identify the applicable slot offset value based on an identity of a physical random access channel (PRACH) resource used for transmission of a random access preamble during the random access procedure.

4. The apparatus of claim 1, wherein the value set is configured via radio resource control (RRC) signaling.

5. The apparatus of claim 4, wherein the value set is configured before the random access procedure.

6. The apparatus of claim 1, wherein the indicator comprises an index value.

7. An apparatus for a User Equipment (UE), comprising:
a memory; and
one or more processors coupled to the memory, wherein the one or more processors are configured to:
receive, from a base station, a grant of resources for an uplink (UL) data transmission in a random access response (RAR) message during a random access procedure;
identify a scheduled slot for the UL data transmission based on a received slot of the RAR message and an applicable slot offset value indicating a number of slots by which the received slot precedes the scheduled slot;
identify a delay value from a value set based on an indicator comprised in the RAR message;
identify the applicable slot offset value by adding the delay value to a base value, wherein the applicable slot offset value is identified based on information comprised in a system information block (SIB); and
transmit the UL data over a physical uplink shared channel (PUSCH) during the scheduled slot.

8. The apparatus of claim 7, wherein the applicable slot offset value is identified based on information comprised in a master information block (MIB).

9. The apparatus of claim 7, wherein the one or more processors are further configured to:
identify the applicable slot offset value based on an identity of a physical random access channel (PRACH) resource used for transmission of a random access preamble during the random access procedure.

10. The apparatus of claim 7, wherein the value set is configured via radio resource control (RRC) signaling.

11. The apparatus of claim 7, wherein the indicator comprises an index value, and wherein the index value points to a particular value in the value set.

12. An apparatus for a base station, comprising:
a memory; and
one or more processors coupled to the memory, wherein the one or more processors are configured to:
transmit, to a User Equipment (UE), a grant of resources for an uplink (UL) data transmission in a random access response (RAR) message during a random access procedure; and
receive the UL data over a physical uplink shared channel (PUSCH) from the UE during a scheduled slot, wherein the scheduled slot is based on a slot of the RAR message and an applicable slot offset value indicating a number of slots by which the slot of the RAR message precedes the scheduled slot;
transmit a system information block (SIB) before the random access procedure, wherein the SIB indicates a base value;

wherein the applicable slot offset value is based on a value set and an indicator comprised in the RAR message, wherein the applicable slot offset value comprises a delay value, and wherein the applicable slot offset value is identified by adding the delay value to the base value.

13. The apparatus of claim 12, wherein the one or more processors are further configured to:
   transmit a master information block (MIB) before the random access procedure, wherein the MIB indicates the base value.

14. The apparatus of claim 12, wherein the one or more processors are further configured to:
   transmit the value set to the UE before the random access procedure.

15. The apparatus of claim 14, wherein the value set is transmitted via radio resource control (RRC) signaling.

16. The apparatus of claim 12, wherein the indicator comprises an index value.

17. The apparatus of claim 16, wherein the index value points to a particular value in the value set.

* * * * *